Aug. 26, 1930.  E. R. LOCHMAN  1,774,279
ELECTRIC TRACER CONTROL MACHINE FOR DIE SINKING AND THE LIKE
Filed Aug. 23, 1926   7 Sheets-Sheet 1
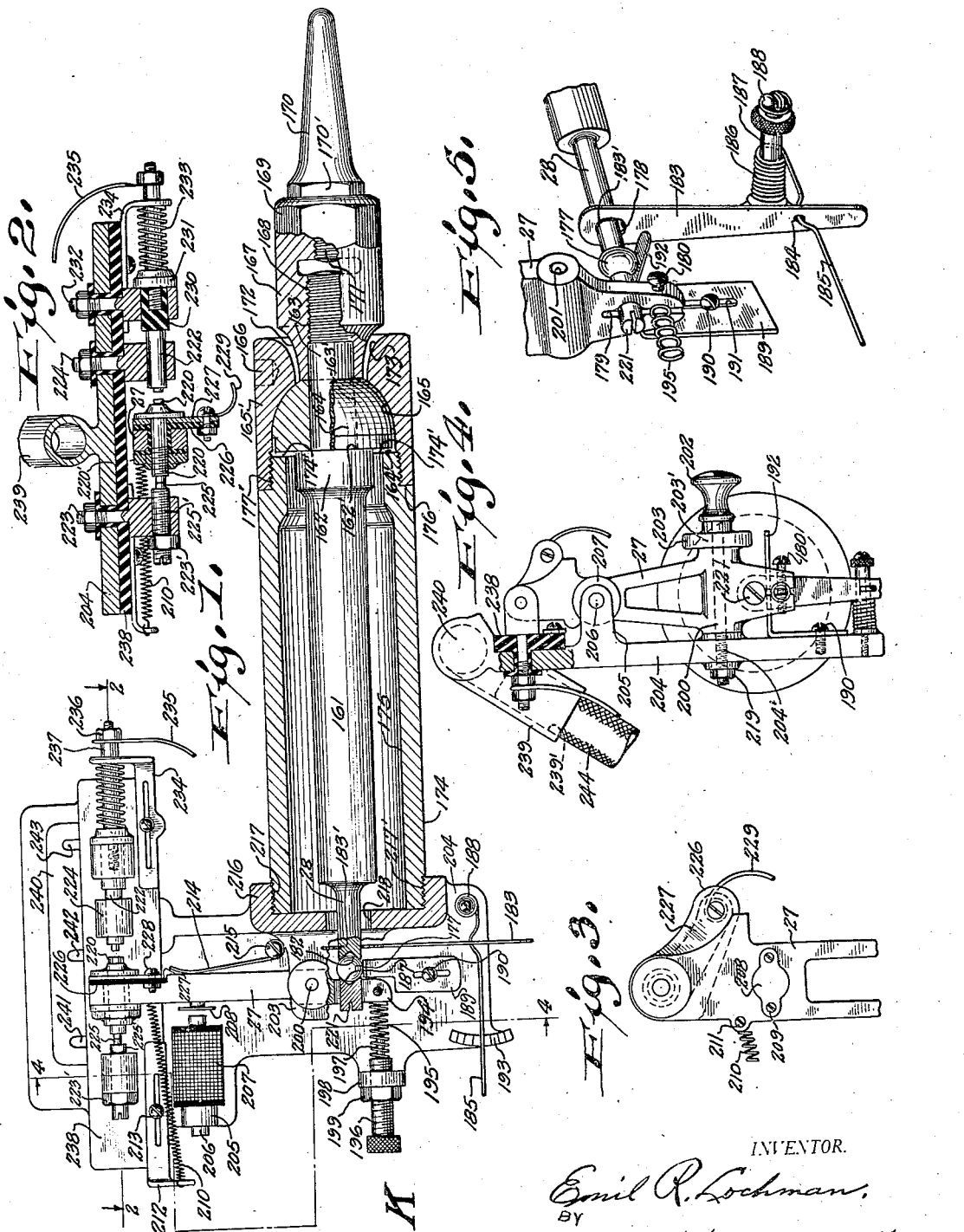
INVENTOR.
Emil R. Lochman,
BY
Morsell, Keeney & Morsell.
ATTORNEYS.

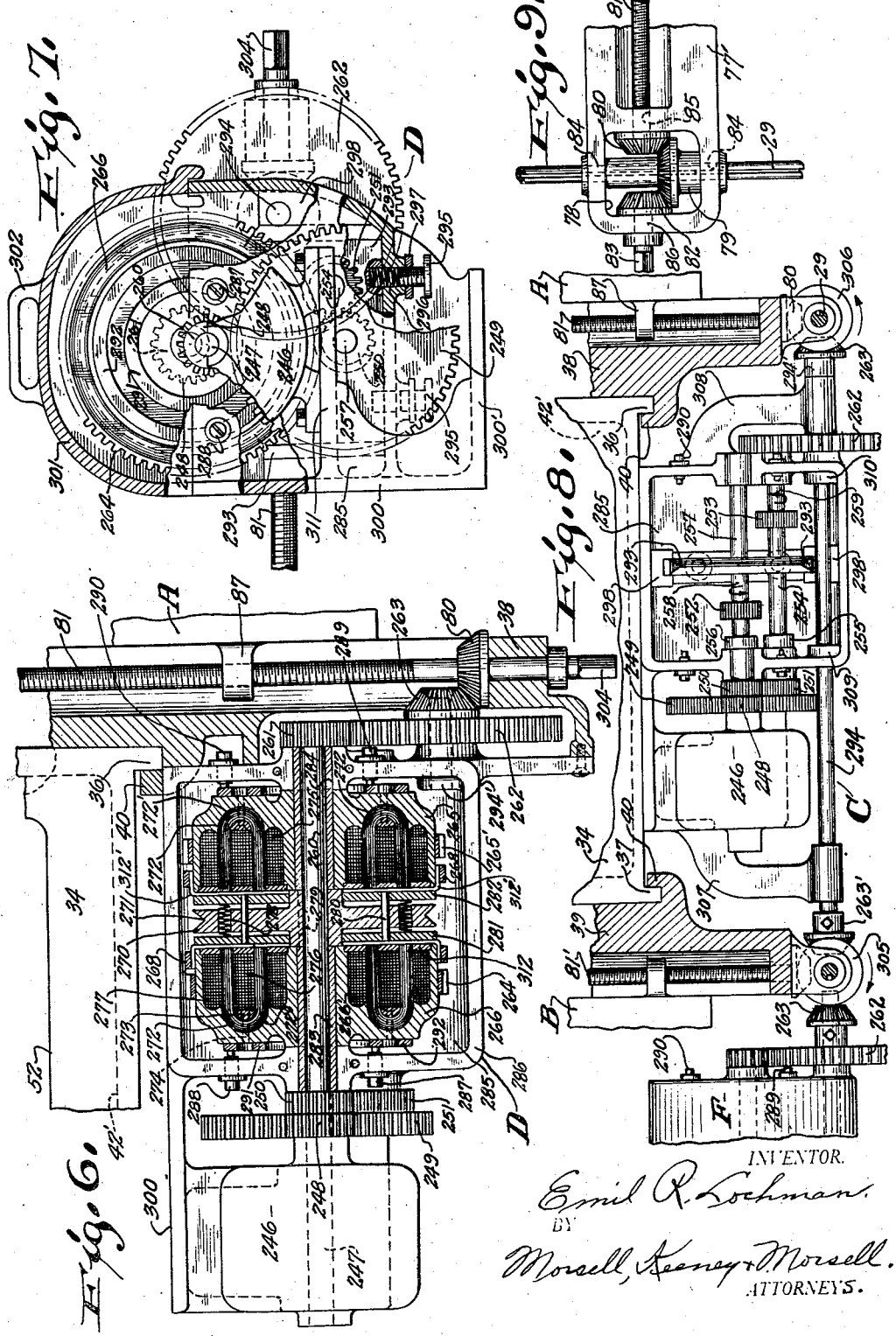

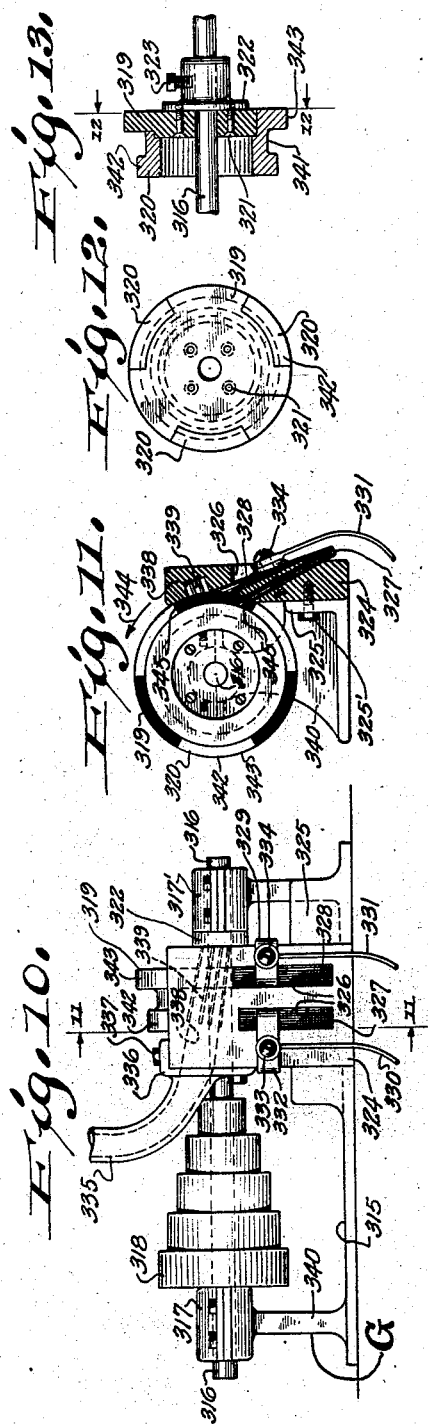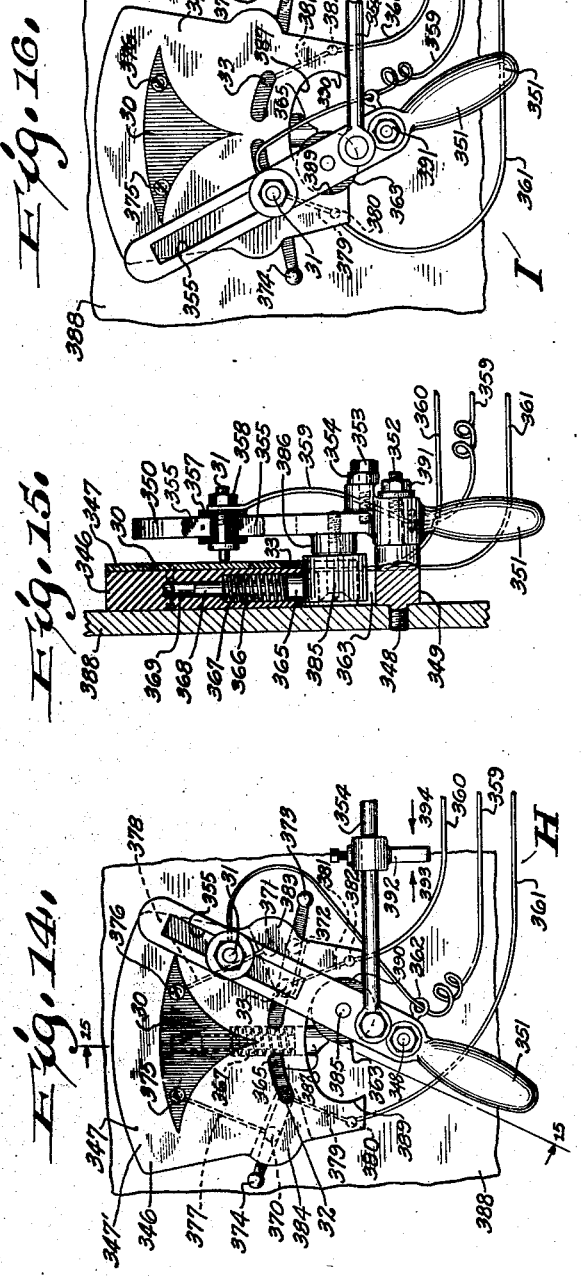

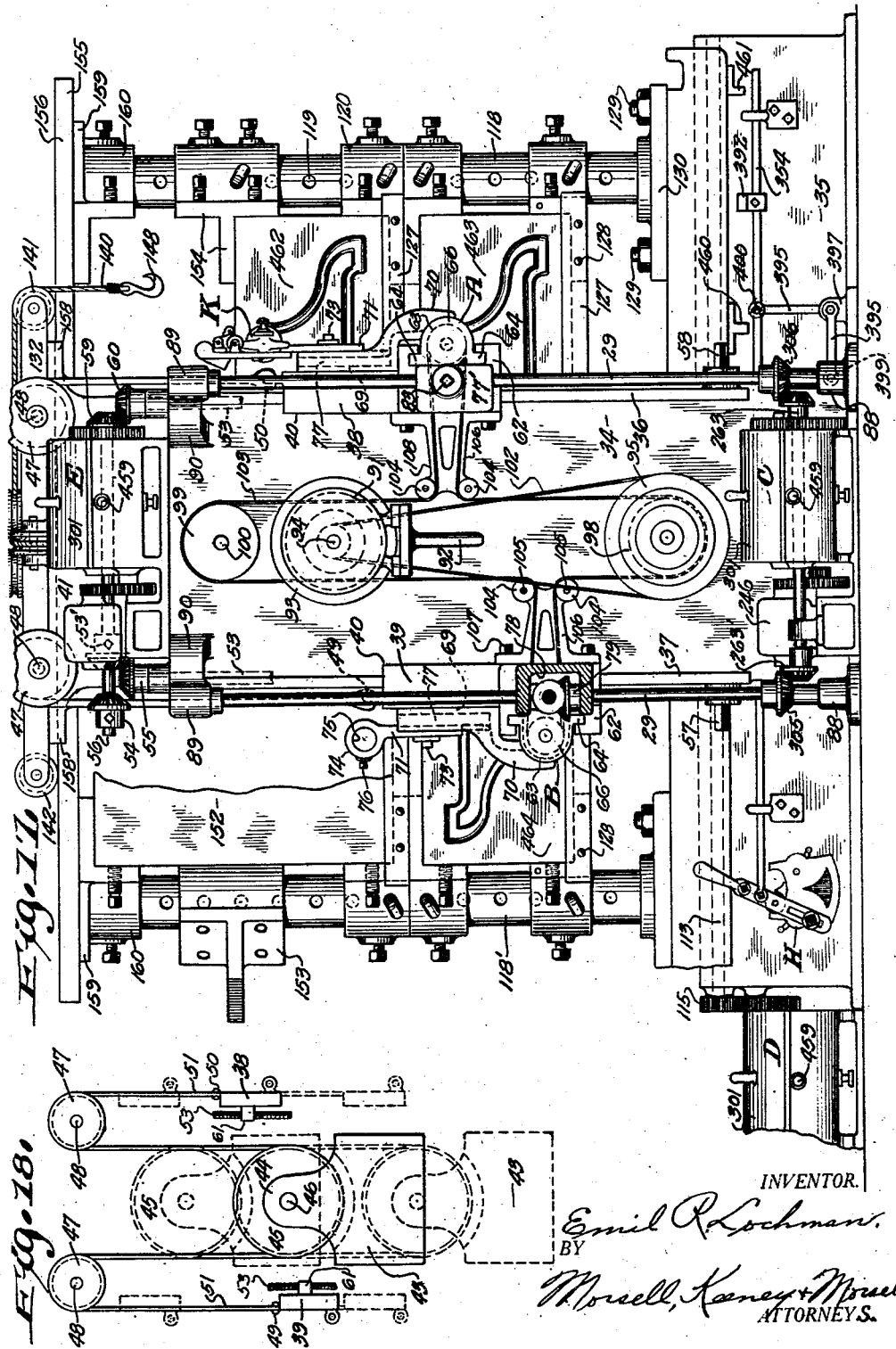

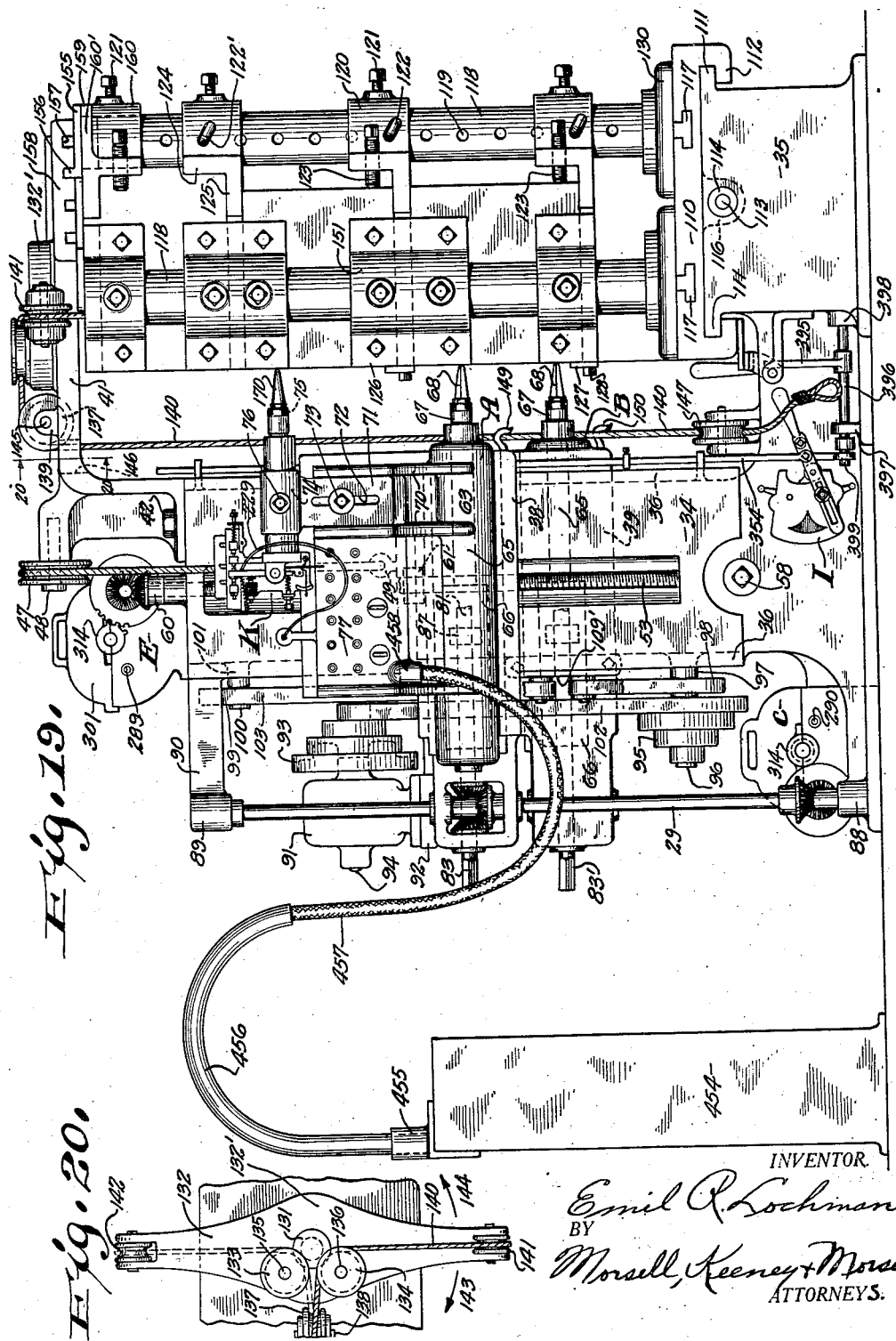

Aug. 26, 1930.　　　　E. R. LOCHMAN　　　　1,774,279
ELECTRIC TRACER CONTROL MACHINE FOR DIE SINKING AND THE LIKE
Filed Aug. 23, 1926　　　7 Sheets-Sheet 6

INVENTOR.
Emil R. Lochman,
BY
Morsell, Kuney & Morsell,
ATTORNEYS.

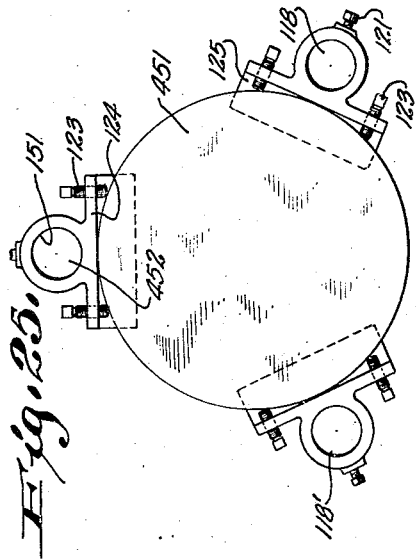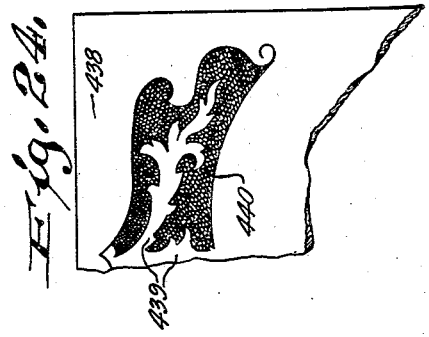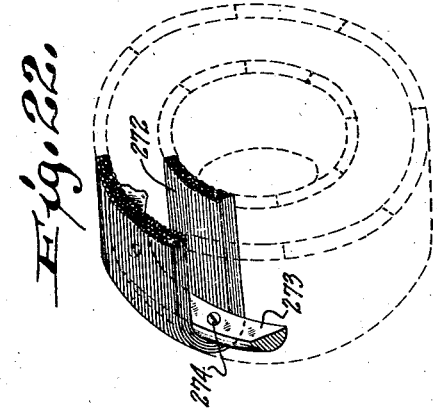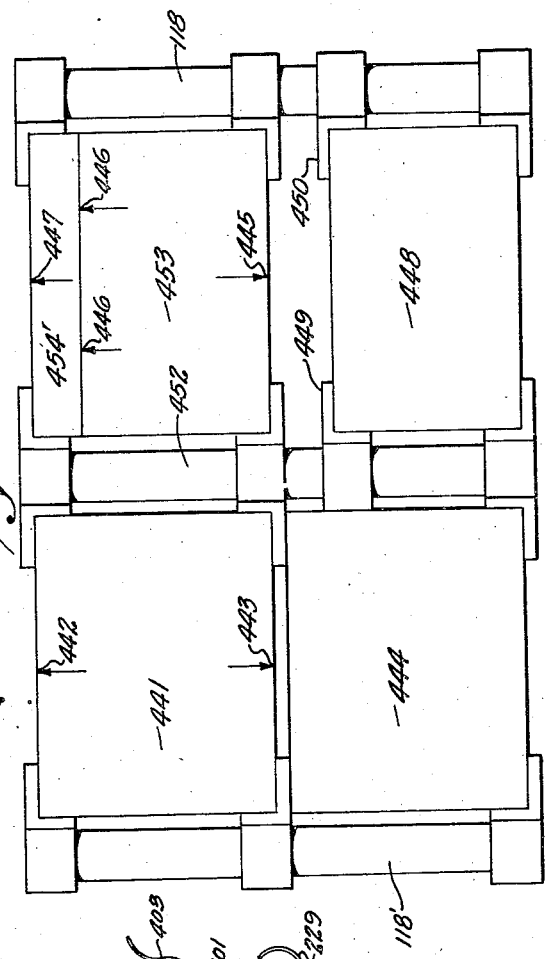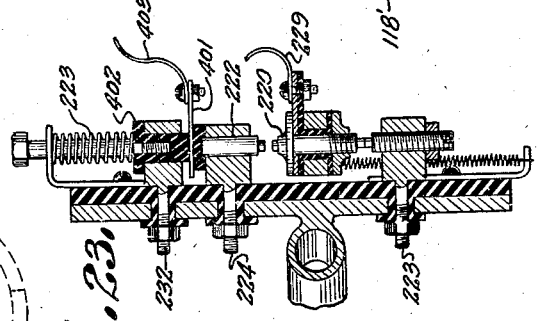

Patented Aug. 26, 1930

1,774,279

UNITED STATES PATENT OFFICE

EMIL R. LOCHMAN, OF MILWAUKEE, WISCONSIN

ELECTRIC TRACER-CONTROL MACHINE FOR DIE SINKING AND THE LIKE

Application filed August 23, 1926. Serial No. 131,036.

My invention relates to improvements in die sinking, carving, and the like machines, designed to cut metal, wood, stone, and analogous materials, and it relates particularly to machines of this type wherein the actions of the cutting tool are automatically controlled by a tracer equipped with electrical contact devices, the latter being adapted to be set in motion by the tracer, to thus cut the exact duplicate of a given pattern in steel or other suitable material, thereby making possible production of dies as well as of a great many other kinds of work in an expeditious manner.

One of the important objects of the invention is to produce a machine of improved construction, whereby a die, or any other object, of hard metal, stone or hard wood can be produced by employing a soft wood or plaster pattern, which latter, of course is cheap and easy to form.

A further object contemplates the employment in the machine of an improved tracer of such construction that a large die comprising simple details can be cut, with the necessity of using only a small section of a pattern, thereby, of course, saving much time and material.

A further very important object contemplated is the employment of improved means to produce from a wood or plaster pattern, or a pattern of other material, the exact copy in a steel die.

A further important object is to provide means whereby the opposite copy of a given pattern (hereinafter called the left hand die) can be produced.

A further very important object is the provision of means whereby the device will cut a right hand and left hand die at the same time from the same pattern.

A further important object is the provision of means whereby the machine will cut two right hand dies from two patterns differing in design and size from each other, the resulting dies being correct copies of two patterns.

A further important object is the provision of means whereby the machine will cut from a given single pattern, two right hand dies, which are alike and also like the pattern.

A further important object is the provision of means which enables the machine to produce from a given pattern, two long dies, of the full length of the stock-frame of a machine, both being right hand or one right hand and one left hand.

A further important object is the provision of an improved counter-weight arrangement, whereby a large counter-weight is located inside of the hollow pedestal of the machine, and balances by means of a continuous cable, the weight of the two tool carrying aprons employed.

The machine in general has many other objects, which will be made clear as the description proceeds, and it might be well at this point to also set forth the advantages which arise from the improved construction, as follows:

The machine will accommodate all kinds and sizes of die blocks and patterns, and they can be set up quickly and correctly in pre-determined positions;

The machine will readily accommodate round and irregular objects in pre-determined positions;

The machine will accommodate more and larger pieces of work than ordinary machines and keep them in correct operating alignment;

The construction is of such character that it will enable the operator to load and unload the machine, to place the stock posts which are employed on the bed of the machine, and to readily set up his stock and pattern on the said stock post by means of a loading device, which is movably mounted;

The arrangement of the stock posts is such as not only to permit the quick and efficient set up of the stock and pattern, but also makes unnecessary the dangerous overloading of the movable stock-frame with heavy angle plates, heavy blocking and the like, which are now being used to give the pattern and stock a rigid set up.

It may be stated at this point that the present invention constitutes improvements, in part at least, upon the construction covered by U. S. Letters Patent issued to me on January 13, 1914, Number 1,084,155. A reference to this patent will show that it comprises a construction wherein the tracer carries an electric contact device as an integral part thereof. It will also be seen that the tracer bar is fulcrumed between its ends, and that said tracer bar has a tracer point removably attached at one end thereof, and an operating finger at the opposite end thereof for cooperating with contact carrying members, and that adjustable means is employed for counter-balancing the weight of the tracer point, and thereby equalizing the arms on each side of the fulcrum of the tracer bar.

It will be furthermore noted from this patent that the fulcrum of the tracer bar which is located between the ends thereof is in the form of a ball and socket bearing to permit universal lateral movement of the tracer bar and finger, said bearing being arranged to also permit longitudinal movement of the tracer bar, and that there is employed a member controlling circuit closing contacts mounted in position to be moved by lateral or longitudinal movement of the finger, together with resilient means for restoring and holding the tracer in normal position.

Furthermore, it will be noted that the socket of the ball and socket bearing is provided, in said patent, with a cylindrical extension to permit lateral or longitudinal movement of the tracer bar and attached tracer and operating finger, the ball and socket bearing being employed as a pivot about which the other parts have universal swinging and end motion.

It has been deemed necessary to thus refer to certain structural features of my prior patent No. 1,084,155, for the reason that in said patent are shown certain forms of power control of the tools by means of the tracer, and having these structural features in mind, the novel features for the tracer and the new controlling members for the tools which are actuated by the tracer, and which form part of my present invention, will be more readily understood. These new features relate more especially to new contact members for the tracer, new and improved high speed magnets having exceedingly quick and powerful magnetic force, a power driven current breaker having a variable speed drive to enable direct electric current to be fed to the magnets through variable small periods, and the controlling of the broken current by the tracer, to thereby control the actions of the feed-screws for the tools.

And with reference to the current breaker mechanism, I would set forth the objects to be attained thereby and the salient features thereof as follows:

The principal object is to adjust and time the magnetic grip of the armature by the magnet and to adjust the length of said contacts to each particular class of work.

An important feature thereof, resides in the fact that by its use, more powerful currents can be utilized, which, of course, speeds up the tracing and cutting operations of the machine to which it is applied to such an extent that numberous uses of the tracer control become possible and commercially desirable, which otherwise would not be the case.

Another important feature of the current breaker resides in the fact that it enables the contacts controlling the feed screw for the tools and tracer to be set very close together, and also close to the contact lever, so that the actual gap between said contacts may be less than one sixty-fourth (1/64) of an inch, thereby reducing the actual lateral motion of the tracer point to a minimum and increasing the accuracy of the work produced by the machine. Moreover, means for producing a powerful air current to extinguish the spark between the breaker points is provided.

In this connection, it is pointed out that my invention does not pertain to the class of electric engraving machines where the pattern is of metal and an electric circuit is closed by the tracer and pattern but, as previously stated, the patterns are mostly of wood, plaster and the like—in other words, non-metallic materials, with the result that there is a very distinct difference in the uses, operation and work produced by the type of machine to which my invention relates, as compared with other types of machines.

Another important object of the invention is to simplify the electric control of the two feed means for the stock-frame and tool supporting aprons which are at right angles to the longitudinal axis of the tracer, by the provision of a feed changing switch which is adapted by the simple adjustment of a contact point, and a small switch lever to alternately change the feed motion of the aprons and the graduated cross feed of the stock-frame in order to apply the first mentioned feed to the stock-frame and the graduated feed to the aprons.

With the above, and other objects in view, my invention consists of the improved machine hereinafter fully described, and its parts and combinations of parts, and all equivalents thereof as I will proceed now to explain and finally claim.

In the accompanying drawings in which the same reference characters indicate the same parts in all of the views:

Fig. 1 is a plan view of the tracer, with parts shown in section, and other parts broken away to illustrate all of the operating parts in full view and in their proper working position;

Fig. 2 is a cross section through the contact points on line 2—2 of Fig. 1;

Fig. 3 is a detail of the contact lever, showing a side view of its upper section and parts mounted thereon;

Fig. 4 is an end view of the tracer with parts broken away to show the wiring connection of one of the contacts;

Fig. 5 is a perspective view of adjustment members connected to and operating with one of the members of the tracer and the contact lever;

Fig. 6 is a top plan view of a control set, showing the magnets, armatures and armature carriers in cross section;

Fig. 7 is a side view of a control set like that shown in Fig. 6 with parts broken away and also showing an end view of one of the magnets with its contact rings and contacts, and all the gearing and parts cooperating with the magnets;

Figure 21:
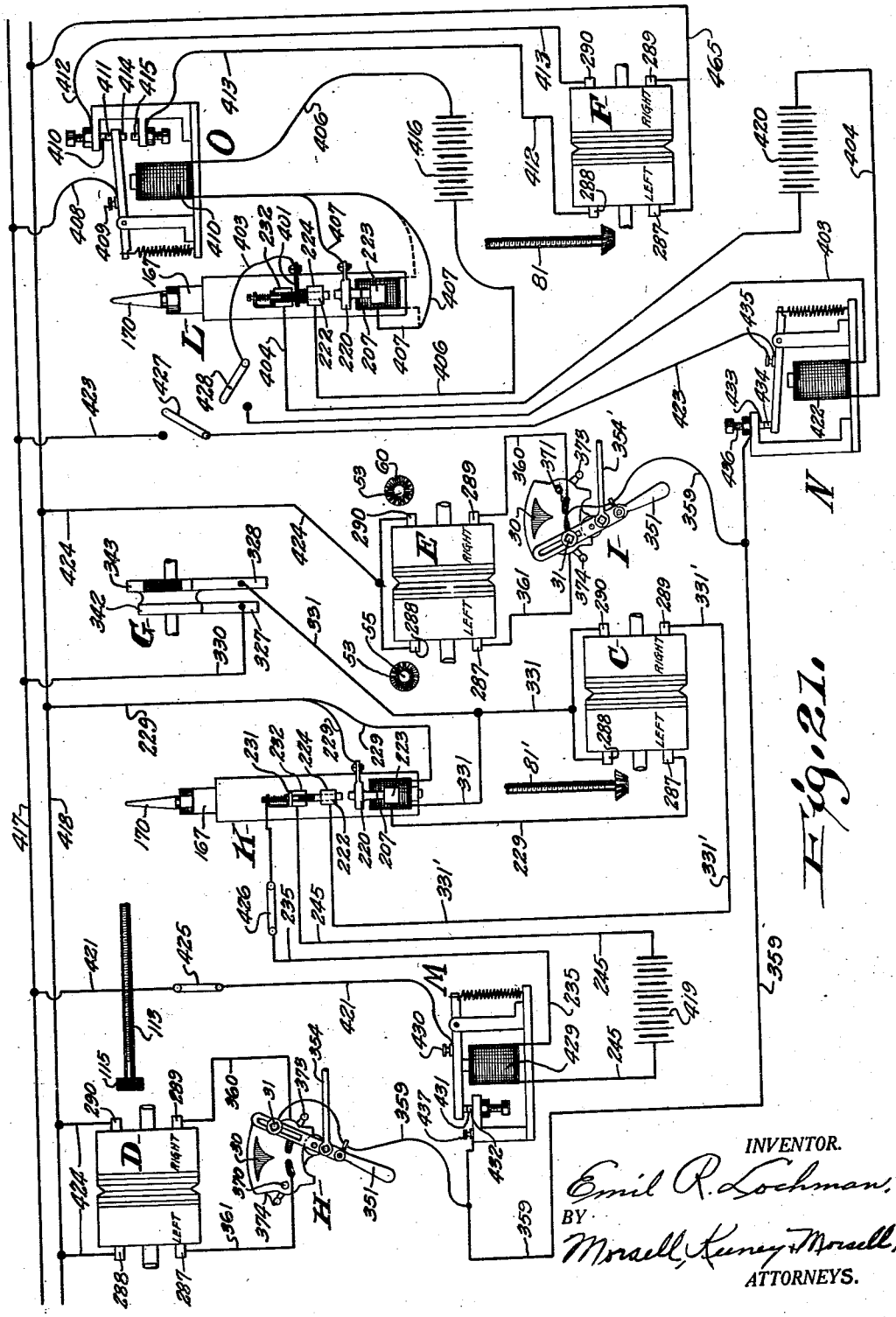

Fig. 8 is a plan view of a slightly modified form of control set with the cover removed from the magnet casing, and with the magnets and shaft lifted out, thereby showing the driving pinions for the magnets and the brake for the armature carrier and the entire arrangement of the inside of the magnet casing, also the shaft and gear connections for controlling two tools at the same time from one control set;

Fig. 9 is a side view of the arm extending from the apron showing the bevel gear connection of the control set with the apron, by means of an upright shaft;

Fig. 10 is a front view of the current breaker, showing the connection of the air supply pipe and the air channel leading across the face of the current breaker disk;

Fig. 11 is a sectional view of Fig. 10 on line 11—11 showing the metal sections and the insulation sections of the current breaker disk, the arrangement of the brushes and the air channel leading across the current breaker disk;

Fig. 12 is a side view of the current breaker disk, showing its construction as seen from line 12—12 of Fig. 13;

Fig. 13 is a cross section of the current breaker disk showing its mounting connection with the shaft;

Fig. 14 is a plan view of the feed changing switch shown connected to the timing plate;

Fig. 15 is a sectional view on line 15—15 of Fig. 14;

Fig. 16 is another plan view of the feed changing switch, but shown with the movable contact set for the constant contacts;

Fig. 17 is a front elevation of the diesinking machine, showing all of the principal features of construction, and showing the location of three of the control sets, and one of the feed changing switches;

Fig. 18 is a diagrammatic front view of my counter-weight arrangement, of which only the guide sheaves show on top of the pedestal and the aprons show in the front and side views of the machine, while the large counter-weight is positioned and operates freely up and down in the hollow inside space of the pedestal;

Fig. 19 is a side elevation of the diesinking machine showing the side view of the principal features of construction, the manner of holding the stock by means of the stock posts, a plan view of a completely equipped tool carriage in proper operating position, and with the electric tracer mounted in proper operating position; further showing two control sets in side view and one of the feed changing switches mounted in proper position on the pedestal and being actuated by the up and down motion of one of the aprons.

Fig. 20 is a plan view of the loading device, showing the positions of the cable as used for either side of the loading beam;

Fig. 21 represents a complete diagram of all of the electrical connections between two tracers and four controlling sets, as well as three relays connected to the tracers by battery circuits, and one of my current breakers being connected to one of the tracers and its control set; and also showing the proper connection of the two feed changing switches and their connection to the control sets controlling the two feed motions of the machine, it being noted that the controlled feed screw is shown next to each control set, but to avoid complication no gear connections are shown;

Fig. 22 is a perspective view of my built up wire core for high speed magnets, one section being shown in detail together with a section of its mounting ring;

Fig. 23 is a modification of Fig. 2 and showing a normally open circuit for the control of the feed motions of the machine;

Fig. 24 is a specimen of work showing an effect of ornamentation made possible by the invention of my current breaker;

Fig. 25 is a diagrammatic plan view showing how large round blanks are set up by means of the stock posts; and Fig. 26 is a diagrammatic set up of two die blanks and two patterns of unequal dimensions and showing the way of tracing and cutting these two jobs of unequal design at the same time. Also showing the arrangement and position of the stock posts for the same.

Referring now more particularly to the drawings, it may be easier to understand the general construction of the machine first; therefore, I will now describe the die sinking and carving machine, and referring to Figs. 17 and 19, the numeral 34 indicates a stationary pedestal having the shape of a rectangular column and terminating into a base which is solidly connected with the bed 35 of the stock frame and preferably solidly cast together into one piece; cast on either side and extending therefrom, the pedestal is provided with a pair of slides 36 and 37 upon which the aprons 38 and 39 are slidingly mounted, and held in true alinement therewith by the gibs 40 (see Fig. 8). An overhanging bridge 41 is rigidly mounted on top of the pedestal by bolts 42. The pedestal is cast hollow with a normal thickness of wall, as indicated by dotted line in Fig. 6, and has a large rectangular space 42' on the inside, with the bottom left open to insert the large counterweight 43 with its upward extending lugs 44 holding the turnable large sheave 45 by bolt 46, the two smaller sheaves 47 are rotatably mounted by studs 48 upon the bridge 41, and a strong cable 51 is attached by the heavy eye bolt 49 to the apron 39, then passed over and into the grooves of the three sheaves 45 and 47 and then fastened to the other apron 38 by means of the heavy eye bolt 50. The cable extends to the counterweight 43 on the inside of the pedestal through a large slot 52, indicated in Fig. 6. The large counterweight 43 is somewhat lighter in weight than the combined weight of the aprons and assembled tool carriages carried by the aprons, so that sufficient weight is carried by the vertical lead screws 53 to overcome all back lash and play between the feedscrews and their nuts 61, as well as any other slight play of the aprons, thereby assuring great accuracy of the work which is required in the cutting of dies. This large counterweight and its novel arrangement of freely counterbalancing the two aprons with their tool carriages and attached parts is of very considerable importance, and I will now describe its diagram Fig. 18 where the positions of the two aprons 38 and 39 and the counterweight 43 are shown in the same working position as in the machine Fig. 17, where the machine is set for cutting one right hand and one left hand die at the same time, and in which operation one apron moves up while the other moves down on their respective slides, while the counterweight remains in the same position. When both aprons are moved to the top of the pedestal, the counterweight moves to the bottom position as shown in dotted lines, while in reverse order the counterweight moves to the top when the aprons slide to the bottom position, as shown in dotted lines. With this novel counterweight arrangement, the aprons on either side of the pedestal may assume any position within the normal reach of the lead screws 53 and the counterweight will always readily adjust itself to any such positions. Furthermore, either one of the aprons may be held stationary, when the machine is operating on only one piece of work, and the counterweight will again accommodate itself to any position of the one moving apron, and be still the right weight therefor. This is of great importance when spotting the tools and tracers for starting any job on the machine; and is accomplished by loosening and setting the bevel pinion 53' out of mesh with bevel pinion 55 by setting it back on the control shaft 56, then both aprons are separated and can be spotted individually to any required position by applying the ordinary crank handle (not shown) to the shaft ends 57 and 58 which are connected to and operate the lead screws 53 by hand operation. When cutting a right hand and a left hand copy, said bevel pinions are again connected as shown in Fig. 17, but if two right hand copies are to be cut, then the bevel pinion 54 is set in mesh with the bevel pinion 55 (keeping therewhile pinion 53 out of mesh), and the machine is ready for cutting two right hand copies, whereby both aprons move up and down together. I will now describe the apron and tool carriage and their operation. There are two sets of them and both being alike, I will only describe one, the same reference numeral referring to like parts on both, excepting where separate adjustment is required. The two tool carriages A and B are movably mounted on their respective aprons 38 and 39 in their respective cross slides 62 whereto the tool casing 63 is fitted with its slides 64 for endwise sliding motion. Each tool casing carries a spindle 65 on which is mounted the long driving drum 66, and to the front end of the chuck 67 the cutting tool 68 is connected. The tool carriage has an upward extending plate 69 and ribs 70 cast thereon, and the bracket 71 is adjustably held between two of said ribs and can be adjusted up and down the length of its slot 72, and is then held in position by cap screw 73. The upper end of said bracket 71 terminates into a sleeve 74 and the tracer is inserted in its bore 75 and is then adjusted endwise and then held in position by setscrew 76. A switch box 77 is mounted on said plate 69 between the other brackets and moves with the tool carriage. The apron 38 has an outward extending arm 77' (see detail Fig. 9) terminating into a pocket 78 and using the bearings 84, 85 and 86, as centers, it houses the three pinions 79, 80 and 82 which connect the lead screw 81 by means of the grooved shaft 29 to the control set C which in turn operates the tool carriage, same being connected to lead screw 81 by nut 87 and thereby driving the tool carriage transversely of the pedestal. The upright shafts 29 run in the lower bearings 88 and in the upper bearings 89 which form the outer part of arms 90 extending from the pedestal, and said upright shafts operate the tool carriages.

The tool driving mechanism is mounted on the rear wall of the pedestal 34 and comprises the motor 91 mounted on bracket 92 cast on the pedestal, and the stepcone 93 is mounted on the motor shaft 94 and driven thereby, and is connected by belt 102 to the stepcone 95 which has connected to it the pulley 98, and both are running on the stud shaft 96 which is mounted in the boss 97 cast on the pedestal. A likewise cast on boss 101 supports the upper driving pulley 99 which runs on the stud shaft 100 mounted in said boss 101. The driving belt 103 for the tools 68 pass over the small idlers 104 which are mounted on the brackets 106 by studs 105 and lead the belt through an opening 109' in the apron to the driving drum 66 mounted on the tool spindle; the bracket 106 is mounted on the apron by capscrews 107 and is carried up and down therewith, thereby keeping the belt 103 always in proper working position. The drive for both spindles being alike, it is only necessary to mention that the belt 103 passes over a like set of idlers carried by the bracket 108, and leading over the other driving drum 66, it will be noticed that both tool spindles are driven by the one endless belt 103 thus making a very simple and effective drive, and by means of the stepcones the cutting tools may be driven at four different speeds.

The stock frame comprises the bed plate 110 endwise movable on the slides 111 and held in sliding position by the gibs 112, the leadscrew 113 engaging the nut 116 cast on the bed plate 110 gives the endwise motion to the latter by means of a gear 115 mounted on the end of said leadscrew and being suitably geared to the control set D. Each of the stock posts 118 is rigidly mounted into a base 130 and held by bolts 129 engaging the T slots 117 in the bed plate 110. Each stock post has a set of spotting holes 119 for pre-fixed positions of the angle brackets 120, and the latter are set in position by sticking a pin 122 through the spotting hole 122' in the bracket and then in the desired location on the post in one of said spotting holes 119, then the angle bracket is firmly held in said position by tightening the set screw 121. The stock posts are placed in proper position on the bed plate with the help of the hoisting device pivotally mounted on top of bridge 41 by the heavy flange bolt 131, which consists of the hoisting beam 132 having a central flange portion 132' on which are loosely mounted the small grooved pulleys 133 and 134 on studs 135 and 136; another grooved pulley 137 is mounted on the bridge by lugs 139 and pin 145; and another grooved pulley 147 is mounted in like manner to the base of the machine; now a rope 140 is passed over the base pulley 147, then through a large hole 146 in the bridge over pulley 137 around the pulley 134 over the pulley 141 at the end of the beam 132, and a hitch is made with the attached hook 148 around one of the stock posts, same being lifted off the bed plate by means of said rope with the free end pulled by a suitable tackle, or said free end may be slipped off the base pulley 147 and be attached to one or both of the hooks 149 and 150 screwed into and carried by the two aprons; said aprons are then set in motion by pressing the proper button switch in the switch box 77 and the said stock post or any other object is automatically hoisted by the machine itself. The operator then swings the stock post with the beam 132 in either direction indicated by the arrows 143 and 144 until the proper location is reached; and then by pressing another switch, the bed plate 110 is set in motion until the desired lengthwise location is reached for placing said stock post when the bed plate is stopped and the rope released, thereby bringing said stock post in its proper location by the operator without any extra help being required. In the same manner all of the stock posts are set, and likewise the machine is loaded and the die blanks or any other object lifted to its proper height, then the angle brackets forming a sleeve 151, see Fig. 25, and turning on the round posts, are swung under the stock blank and then fastened to the stock post in the manner described; and when all of the angle brackets are set, the straight edges 127 are set against the lower edge of the die blanks and fastened to the angle brackets by screws 128, then the setscrews 123 are tightened, screwing the die blank firmly against the straight edge in front, and then setting the pattern in a similar manner, the machine is ready for operation. Fig. 17 illustrates the manner of swinging an angle bracket 153 outward and out of the way of a large die blank 152. This also illustrates another great advantage of the machine, namely of setting up an extra large die blank on the left side of the stock frame and the pattern on the right side, so that either piece can take up the entire height of the stock frame, then having the tracer work on one side and controlling the cutting tool in the opposite tool carriage. It will be noticed that each angle bracket forms a right angle with its upright flange 124 and its horizontal flange 125, or it may be fixed to hold two pieces like brackets 153 and 154.

The rear stock posts 118 carry a guide rail 155 having an upward extending member 156 which engages the slots 157 of an extension 158 of the bridge 41. This guide rail and the other parts are connected together in any manner desired and the rail 155 is firmly mounted on top of said stock posts and fastened to the angle brackets 160 as desired, which are therefore especially provided with the flanges 159. The object of the guide rail is to guide the stock frame in true alinement with the bed plate 110, thereby allowing greater height of the machine for operating on larger stock, and gaining accuracy of work with comparatively light fixtures. When the rear stock posts or the guide rail are to be re-set, the angle brackets 160 are loosened and dropped far enough to pull out the spacing discs 160', this allows the guide rail 155 to drop out of engagement with the slots 157 and it can then be re-set either backward or forward to whatever position the work requires, then the mounting parts are replaced and the machine is ready to operate.

The electric controlling devices of the machine comprise one or more tracers, three or more control sets, two feed changing switches, one or more current breakers and suitable relays, batteries and common switches. I will now describe said parts.

The electric tracer, see Fig. 1, is one of the most important parts of the machine, and by its use the various functions and uses of the machine are made possible, and most of the actions of the machine are controlled thereby. All parts of the tracer itself are mounted on the shank 161 having an enlarged portion 162 and a reduced section 163 forming a shoulder 162' against which the part ball member 164 rests, and together with the ball socket 165 forms the fulcrum about which the lateral motions of the tracer point take place. The ball member 164 has a bore 163' which fits the reduced section 163 and is forced against the shoulder 162' by the chuck member 167 screwed onto the threaded part 168 of the shank by turning the hexagon 169. However, the nut 165' forming the ball socket 165 on its inside is passed over the ball before the chuck is screwed on; the section 172 of the chuck and 173 of the nut, where said chuck fits into the nut, are curved and leave a gap, allowing space for the lateral motion of the tracer or point 170 which has a reduced screw threaded portion 171, and is screwed thereby into the chuck 167. The tubular section 174 is the principal support for all of the tracer parts and contact devices. It has a screw threaded portion 217 on its outer end, another one, 177', on the inner end, which is reduced, and the nut 165' is screwed onto it, and is tightly forced against the shoulder 176, a hole 166 being provided for the use of a spanner wrench for said purpose. This brings the assembled tracer into the tube 175, to which outer screw part the contact holder 204 is securely fastened by its screw threaded cap 216, which has a hole 218 in its center through which the member 28 of the tracer shank 161 extends. The contact holder 204 is a casting terminating into a pipe section 240 with a rearward extension 239 into which a flexible hose is secured for supplying a strong draft of air to the contact points through the slots 241, 242 and 243, cut into the pipe section 240. The contact lever 27 is pivotally mounted on the contact holder by means of the pin 200 passing through suitable holes 203' in lug 203 and 204', the pin end being threaded and passing through the bore 201 in the contact lever and is threaded into the part 204. The lever is firmly but movably secured and held by the lock nut 219. The outer end of the pin 200 has the knob 202 for readily pulling out and handling of the pin when adjustments or cleaning of the contacts become necessary. A strip of insulating material 238 is secured near the top of the contact holder and the contacts 223 and 224 and 232 are mounted on the same and are suitably bushed and provided with washers of insulating material, it being understood that all contacts are properly insulated from each other and from the holder. Each contact has a reduced part with screw threaded end for securing it to the holder, and a bore for the contact bolt proper, but to simplify the description and the reading of the wiring diagram, I will only use 223, 224 and 232 as description for said three contacts. Contact 223 has an adjustable point 225 set into the screw 225' screwed into said contact and used for adjusting the gap between the contact points. Contact 224 has an endwise sliding contact bolt 222 which is secured to the insulation sleeve 230 which moves endwise therewith, and in so doing breaks the contacts 232 and 231, which latter is in the form of a washer pressed against contact 232 by coil spring 233, and kept under proper tension by the adjustable clip 234. Said contact 231 is firmly screwed into the insulation sleeve 230 and has endwise motion therewith.

The contact lever 27 and its operation and adjustments will now be described further. It carries in its upper head the contact 220 insulated by insulation 226 therefrom and firmly held in place by nut 220'. Extending and connected with the contact 220 is the connector 227 to which the wire 229 is connected by screw 228. The flat spring 214 exerts pressure against the contact lever 27 and is adjustable and held by screw 215 in its adjusted position. A small coil spring 210 is also attached to said contact lever and exerts pull in the same direction, and its end is attached to clip 212 and held in its adjusted position by screw 213. A compression spring 195 is held in adjustable position by setscrew 196 passing through the threaded lug 198 and holding the spring on its reduced shank 197 and pressing it against the lower free end of the contact lever 27, and when properly adjusted, it is held in position by lock nut 199. A slotted setscrew 221 is inserted in said lower end of the contact lever 27 which is split, and when said screw is adjusted, it is held in position by the clamping screw 180. The member part 28 of tracer shank 161 has a countersink 182 which is directly opposite a countersink 187 of setscrew 221, and a steel ball 177 is located and held between said countersinks, and its weight is supported by a small flat spring 192 forming part of the clip 189 and said clip is adjustably mounted on the contact holder 204 and held by the screw 190. When tracer points are changed becoming heavier or lighter, then the tracer must be balanced like a scale beam. For this purpose a small steel strip 183 is passed over the end of member 28 and held in a shallow groove 183', and the indicating coil spring 185 is passed through the hole 184 in the lower part of the strip, and the weight of the tracer is balanced by turning the sleeve 187 to which the end of the coil spring is fastened until said spring has the proper tension to balance the tracer evenly for both sides extending from the ball and socket joint, which is indicated by the straight part 185 of said spring which points then to the center of the small scale 193. It is best to pull out pin 200 and remove the contact lever 27 when said adjustment is made, so that the tracer swings freely on its fulcrum. A solenoid magnet 207 is held in position by its core 206 being firmly mounted in the lug 205, with its free end set closely against the small sheet metal armature 208 mounted on the contact lever 27 by screws 209. The action of the tracer will be explained later, and in connection with the wiring diagram.

The magnet control set, herein referred to as the control set (see Figs. 6, 7 and 8), comprises as its principal members, two high speed magnets driven in opposite directions by motor 246 and gearing, as shown, and thereby through suitable connections operate one or more lead screws which in turn either operate or rather guide, the tools, or move the stock on which the tools operate. There are four control sets marked on the wiring diagram, namely, C, D, E and F, and all four are used when the machine is set up for cutting two different dies from two different patterns, while for all other kinds of work only three control sets are used. Only three control sets, namely, C, D and E are shown in connection with the front and side views of the machine (see Figs. 17 and 19) in order to bring out other parts clearly, while the location of the control set F is shown in Fig. 8 where it is only required to set the bevel pinion 263' out of engagement with the bevel gear 305, and then set bevel pinion 263 of control set F in mesh with the bevel gear 305 for the above mentioned set up for cutting two differing dies from two differing patterns. All control sets shown and used in connection with this machine are in their working elements exactly alike, excepting that the control set D shown in full detail, is geared to control only one lead screw and is shown bolted to an apron of the machine, and in that case it is carried up and down on the pedestal with the apron, and is shown to illustrate that kind of use. However, this complicates the machine very considerably, and loads up the working parts controlled by the magnets with a mass of unnecessary weight which effects their efficiency and speed of operation, and for above stated reasons is not used in connection with the machine shown in Figs. 17 and 19. All of the control sets shown therein remain stationary, and the tool control set C has feathered gear connection to the long upright shafts 29 which are grooved to operate said feathered gears, and by this arrangement, I operate both up and downward moving tools from one stationary control set C, thereby simplifying the construction of the machine, and making it more efficient and making it possible to use a very simple and efficient driving mechanism for the cutting tools by operating both of them with one belt and from one motor. This new construction makes it possible to operate on and produce two dies at the same time, and I intend to claim these features broadly.

The wire core magnet is one of the most important features of my invention (see Figs. 6 and 22), of which the latter is a detail view of the wire core 272 itself and readily illustrates its construction. It is built up of comparatively thin soft iron wire, and is preferably built up in sections, as shown in Fig. 22. Said sections are set in the semicircular recess 272' of the magnet 266 of which the main body is made of soft magnetic iron, and these sections then form a complete ring and are held in position by the clamping ring 273. Two other recesses 266' are provided in the magnet, thereby providing three recesses for each magnet, which receive the three coils 275, 276 and 277, of which the coil 276 is placed between the shanks of the horseshoe shaped wire core 272. These coils are kept in place by thin sheet rings 312 of non-magnetic material, which cover the outer gaps and are suitably fastened, thereby forming a straight face, which is then covered with a thin sheet of friction paper 312', which is bent over the outer edge of the assembled magnet and held in place by the ring 268. A suitable glue or cement is used in further holding said friction paper on the face of the magnet. All magnets used in the control sets are built alike, and must be alike so that the magnetic flux operating the controlled parts located between two magnets, is evenly balanced, which is needed for their proper action. The magnets and controlled parts for one control set are assembled on the shaft 260 as follows: The armature carrier 270 is firmly mounted on the central portion of shaft 260, by means of the key 279 and is a plain disk formed of non-magnetic metal, with about eight holes for the compression springs 278 fitting said holes loosely, and exerting an even pressure to both armatures. About eight pins 280 are tightly driven in suitable holes in said disk, and said disk has an extending hub on either side on which the armatures 281 and 282 are loosely fitted and carried, and have an even number of holes fitting the pins 280 loosely, and the armature carrier 270 is moved by means of said pins, whenever the magnets are energized and attract the armatures by means of the electric current flowing through the respective coils. This is done in exceedingly quick succession by means of the wire core, which takes the place of a solid mass of iron, and divides this mass into about 1200 separate magnets which are insulated from each other by a suitable enamel or like substance, all of which causes the exceedingly quick and sensitive action of my high speed magnets. This feature is of the utmost importance in the operation of machines of this type, and I intend to claim this feature broadly.

It is furthermore of great importance to have the said magnets, their driving motor and suitable connecting and transmission gearing properly connected together and mounted in and about a suitable casing, thereby uniting all of said parts into a complete and independent unit to be used in connection with any machine where such control is of commercial value. I will now proceed with the further description of the assembling of one of my control sets. The armature carrier 270 being mounted in the central portion of said shaft 260 and being equipped with its springs 278 and pins 280 and the armatures 281 and 282, the bushings 283 and 284 are now passed over the shaft and set up against the armature carrier, and the two control magnets 265 and 266 are passed over said bushings and up against the hub of the armature carrier 270 which forms a shoulder holding both the bushings and the magnets in proper location. The pinion 261 is then firmly mounted on one end of said shaft, and these assembled parts are set into the casing 286, and firmly mounted by clamping the outer ends of the bushings tight with the caps 314, so that the shaft 260 turns freely on the inside of the bushings, while the magnets turn on the outside of them. Each magnet is provided with two contact rings 291 and 292, see Fig. 7, and two contacts 287 and 288 are set into one side of the casing in contact with the rings of one magnet, while the contacts 289 and 290 are set into the other side of the casing and are in contact with the two rings of the other magnet. These rings are insulated and the three coils 275, 276 and 277 are suitably wired to said contact rings. On the outside of the magnets are mounted the gear rings 264 and 265' preferably made of non-magnetic metal, and these gear rings mesh with the two pinions 252 and 253 located near the bottom of the chamber 285 formed by the casing 286 in which they are mounted on shafts 254 and 257, and held in alinement by the set-collars 255 and 256. On the outside of said casing, on said shafts, are mounted the pinions 250 and 251, which are set in operation by the motor 246, its pinion 248 mounted on its shaft 247, and meshing with the large gear 249 which is also mounted on shaft 257, and in turn operates the outside pinions 250 and 251 in opposite directions and driving the inner pinions 252 and 253 also in opposite directions, as indicated by arrows 258 and 259 (see Fig. 8). The magnet ring gears 264 and 265' meshing therewith are also driven in opposite directions, and alternately turn the armature carrier 270 in one direction, or in the other, according to the switching on and off of the current circuits by the contact lever 27 of the tracer, and thereby alternately energize one magnet or the other, according to the variations of the surface which the tracer follows, and which by means of the control set is transferred to the tool, which is thereby cutting the copy of the pattern.

The gearing from the control set to the machine or machine part may vary greatly according to the speed or the work required. However, the transmission shown in the control sets, Figs. 6, 7 and 8, may be taken as a standard. The pinion 261 controlled by the magnets, meshes with and drives the large gear 262 mounted on the shaft 294, which in turn drives the pinions 263 and 263', and these pinions drive the bevel gears 305 and 306, mounted on the upright shafts 29, whereby the control set C controls both of the cutting tools, as already described. Where shown in Fig. 6, the control set D controls only one lead screw, the gear 262 and the bevel pinion 263 connected thereto, are both running as idlers on stud shaft 294'. It is understood that the shaft 294 may be any length, and more than two tools may be controlled thereby, and then the magnets are built larger to suit the requirements.

The brake 293 remains to be described. It is located in the chamber 285, and is preferably made of plywood, so that considerable end-grain is used in the brake surface, which fits into the V groove 271 of the armature carrier 270, and reaches about one-third of its bottom surface. It is kept in constant tension and frictional engagement therewith by setscrews 295 which furnish adjustable pressure to the coil springs 296, and when properly adjusted, the setscrews are locked by lock nuts 297. Suitable seats are bored in the bottom of the brake 293 to receive said springs. The object of the brake is to prevent undue vibration of the armature carrier 270, and thereby steady the tracer and cutting action of the tool, resulting in smoother work. The brake 293 is inserted into the grooves of the vertical slides 298 cast on the inner side of the magnet casing chamber 285.

The current breaker G, see Figs. 10, 11, 12 and 13, will now be described. It is mounted on the base 315, which is provided with brackets 340, and the current breaker G is mounted on shaft 316 journaled in bearings 317 and 317' mounted in said brackets 340, and is driven by the step cone 318 having a number of suitable steps for varying the speed of the current breaker to suit the various kinds of work accomplished with my tracer control in connection with my current breaker. The breaker disk 319 is made of heavy insulating material with three sections 320 cut out, and the supply ring 342 is made of suitable brass or other good conducting material and is formed with an annular recessed section 341 and a raised annular section 343 which has three sections cut out, and the three remaining sections fit into and fill up the three cut out sections of the insulating disk 319, thus forming three sections of brass alternating with three sections of insulation, as plainly shown in Fig. 11. The current breaker part 319 is mounted on shaft 316 by the flange 322 and held by the screws 321, and the setscrew 323 holds the assembled disk in position, while the breaker disk 319 insulates the current conducting parts from the shaft. The brush holder 324 is of insulating material and the slots 326 receive the brushes 327 and 328 and are held in position by clamps 332 and 329 and screws 333 and 334, which also hold the wires 330 and 331. The brush holder 324 is firmly mounted on the flange 325 of base 315 by screws 325', and its upper end is provided with an air channel 338, and has partitions 339 of sheet mica, which divide said channel into three parts. The air pipe 335 is provided with a flange 336 and is thereby fastened to the brush holder 324 by screws 337, and said pipe supplies a strong draft of air immediately in front of brush 328 thereby cutting off the spark when the conducting brass sections leave the brush to break the current, and give prompt and precise action to the current breaker. This action is greatly assisted by the mica partitions 339 which are set down to the surface 343 of the breaker disc and divide the air channel in sections whereby each section acts as an independent channel. The current breaker turns in the direction of arrow 344 and its action of breaking the electric current in longer or shorter periods, according to the varying speed it is driven, is of the greatest importance in electric control apparatus of the type described herein, which is used in connection with electric contacts operated and attached to the tracer, as it eliminates all of the arcing between the tracer contacts and permits them to be set very close, or less than 1/64 of an inch apart, which reduces the lateral motion of the tracer point to such an extent that a few thousandths part of an inch is sufficient to operate the contact lever 27. Furthermore, the current breaker speeds up the action of the machine on which my tracer control is used to such an extent that various kinds and classes of work can be handled very profitably, which otherwise would not pay. The current breaker changes the action of the tracer, control set and machine entirely, as it does not depend on the tracer itself to break the current (which it would do when used in connection with a relay), and I have found that I can increase the tracing and cutting action of the machine with the use of my current breaker readily to four times the speed that is possible when used in connection with a relay. This is self-explanatory, when it is noticed that with a relay, the tracer action must first operate the battery circuit, which is purposely weak to prevent arcing between the tracer contacts and consequently slow in action, then the relay magnet must in turn operate the power circuit and energize one of the control magnets, which in turn operates the feed screw, thereby causing the next action of the tracer, then relay, etc. However, the relay is of use when the machine is operating on hard steel, where slow action is permissible and still of commercial value, and I use it in operating the tools at times, but I use it principally in operating the feed motions of the machine, and in connection with my feed changing switches, while I operate the axial motion of the tracer and cutting tool preferably with my current breaker. I will now describe the feed changing switch (see Figs. 14, 15, 16 and 21). The contact carrier 346 is of insulating material and carries the power line contacts 32 and 33, which are set even with the surface 347' and so is the timing plate 30 which is inserted in the plate 347 and even with its surface, so that the contact 31 carried by the lever 351 slides over an even surface when it changes from one contact to another, which also assists in extinguishing the arcing between the contacts. The slots 383 and 384 cut into the lower block 346 give operating room for the small switches 373 and 374, and said switches are pivoted to the contacts 32 and 33 and are arranged to make the connections to the timing plate 30 by means of the connecting wires 377 and 378, and the other short connecting wires 379 and 381 lead to the connecting screws 380 and 382, where the line wires 360 and 361 are connected to the feed changing switch H. A pointed bolt 365 is located in the center of the cut out 387, and the block 346 has a large bore 366 and a smaller one 369 in line therewith to receive the reduced shank 369 of said bolt. A compression spring 367 is mounted on the shank and is interposed between its shoulder and the shoulder formed by the two bores. The feed changing switch is suitably mounted in a proper location and in any position on the body of the machine 388, and a stud 349 with its screw portion 348 is threaded into said body of the machine, and the lever 351 is pivotally mounted on the pivot formed by said stud and is suitably held in place by nut 391. Said lever is operated by a shifting rod 354 and its end is pivotally mounted thereon by capscrew 353 and is shifted endwise by certain dogs pushing against the dog 392 in directions of arrows 393 and 394. When shifted in the latter direction, the roller 363 pivotally mounted by bolt 385 to the boss 386 on the lower side of the lever 351, pushes the bolt 365 upward and is pushed by said dog until slightly past the center, when the spring pushing the point of the bolt 365 forwardly, partly turns the roller 363 and snaps the lever 351 over on the opposite contact, and is held in that position by the bolt 365 holding the roller against the wall 389 of the cut out 387 until the same action is repeated from the other side. The lower contacts 32 and 33 are for the continuous feed motion of either stock frame or aprons, while the timing plate contact 30 is for the graduated cross feed, of either stock frame or tool carrying aprons, but one feed changing switch is always set for the continuous feed, while the other is set for the cross feed, to suit the cutting motion of the tools, for cutting with the continuous feed either horizontally or vertically over the stock, according to the requirements of the job in hand. This change for either one or the other service of the switch is made by simply changing the position of the contact point 31 in the slot 355 and setting the small switch 374 on contact 370, as shown in Fig. 14, and this sets the machine for graduated cross feed of the stock frame, while the feed changing switch I (see Fig. 16) is set for the continuous feed of the tool carrying aprons up and down on the pedestal, and the switches are shown in these respective working positions in Figs. 17 and 19, and the shifting rods are jointly connected by the bell crank 395 turning on the rod 396 mounted in bearings 397 and 398 and being connected by pivots 399 and 400 to the respective shifting rods for joint action, and said action is always supplied by the switch and shifting rod set for continuous feed motion, and the cross feed is always set for only one magnet, so that the gradual cross feed is always in one direction, although the switch lever 251 passes back and forth over the timing plate contact in both directions, and if the end of the cross feed is reached, and it is desired to set the cross feed in the other direction, then the small switch 374 is pulled out of engagement with contact 370, and the switch 373 is set in engagement with contact 371, which switches in the connection with the opposite magnet. The amount of cross feed must be adjustable and varies according to a finer or coarser cut to be taken by the cutting tools, and this is accomplished by setting the contact 31 in various positions with respect to the timing plate contact 31. If set near the inner point of it, the contact is short for fine feed, and if set to the outer edge, the contact is long for coarse feed, and it can be set for any variation between these two extreme limits. A screw eye 362 is put on the lever 351 to support the loose wire 359 leading to and connected with the insulated contact 31, which is insulated from the lever 351 by insulation 357.

The ornamental work, of which a specimen is shown in Fig. 24, illustrates only one of the various classes of work that can be produced by the joint action of the various parts of the electric control apparatus shown and explained herein. Said ornamental effect is produced with the use of the K tracer, G current breaker, set for slow speed, and C control set. For a pattern, the stippled part of the ornament is simply cut out in thin wood about 1/8 of an inch, and the remaining part is glued on a suitable board, and this completes the pattern. Then the pattern and stock are suitably fastened on the stock frame. A suitable tracer point and a cutting tool are inserted in their respective holders, whereby the cutter projects slightly in front of the tracer point, and the machine is set for a comparatively coarse feed, and will then produce this stippling effect by an even vibrating motion of the tool and tracer while following over the pattern. This vibrating action may be suitably adjusted by simply increasing or decreasing the speed of the current breaker. This same effect can be produced in sheet metal, but the sheet to be worked is securely fastened on top of a soft board of wood, and instead of a cutting tool, a hardened stippling tool is used of the same size and shape as the tracer.

Arrangement of stock posts, as shown in the diagrams Figs. 25 and 26, show their usefulness and ready application for setting up various classes of work, as these machines are used for machining difficult pieces of work of various design and form beside cutting dies. Fig. 25 shows the set up for large round disks like 451. The stock posts 118, 118' and 452 are set in a way so that the angle-brackets with their respective setscrews 123 grip this disk in the manner of a three jaw chuck. The diagram is self-explanatory. However, by means of the spotting holes 119, the pattern, or another disk of the same size, is quickly set in position below or above said disk 451, using the angle brackets or same and settting them on the stock posts in the manner described.

Fig. 26 shows the manner of set up for two jobs that differ in size and design, but are set up to be cut at the same time, as some dies, cut of pre-hardened steel, sometimes take a week or more for cutting one die, and consequently my machine and the manner of setting up the work with my stock posts and angle brackets is of considerable importance, and is a great time and labor saver. Die block 444 and pattern 441 are of equal size and are set up in the manner shown, while the die block 448 and pattern 453 are smaller and the difference in height is made up by a plain block of wood 454′. The tracer tracing pattern 441 takes the lead and the feed motion is set to trace the whole height of said pattern from point 442 to point 443. In the meantime the tracer on pattern 453 follows from point 447 to point 446 over the plain block 454′, and this supports the tracer for said distance, and makes it possible to work both jobs at the same time. This diagram further illustrates the placing of stock posts 452 in the center between the die blocks 444 and 448. This manner of set up is used most of the time when the machine is operating on two dies at the same time.

The wiring diagram, Fig. 21, will now be described, which explains the working of the machine and the cooperation of the various control members with relation to each other and with the machine. Every unit is marked with a capital letter for easy reference and reading of the diagram. The control sets C, D, E and F are all alike in their construction, as hereinbefore explained, and the contacts 287 and 288 for the left hand magnet (being marked "Left"), are the same on all control sets as well as the contacts 289 and 290 for the right hand magnet, turning to the right (being marked "Right"), it being understood that each control set has and is driven by a suitable small motor 246. All of the power circuit current for operating the magnets of the four control sets C, D, E and F is, for easy reading, taken from separate leads from the main power line 417 and 418, there being four power circuits. The three power circuits for the D, E and F control sets are operated through interposed relays M, N and O, which are operated from three different batteries 419, 420 and 416, while the control set C which is connected to the K tracer and two cutting tools, is operated through the current breaker G, while the wire 229 of said circuit is directly connected with the contact 220 and the coil 207 connected to the K tracer. The feed control sets D and E, together with their respective feed changing switches H and I are both controlled from one tracer by means of the connecting wire 359, which feed control can be connected to either one tracer or the other by means of the switches 425 and 426, and 427 and 428, of which the latter two are open, and the former closed, showing that the feed control sets D and C are controlled from the K tracer. The D control set operates the long feed screw 113 moving the stock frame, while the E control set operates the vertical feed screws 53 moving the aprons 38 and 39 together with the tools and tracers up and down the slides 36 and 37 of the pedestal 34. The control set C operates the two feed screws 81 and 81′ through suitable gear connections and by means of the two upright shafts 29, and said control set C is located in the rear of pedestal 34 and at the bottom thereof. Considering the control sets C and F for operating tracer and tools, both act alike, the left magnet controlling the feed motion of the lead screws 81′ and 81, feeds tools and tracer to the pattern and stock and will be known as the "to" motion, while the right magnet, feeding from pattern and stock will be known as the "from" motion.

Considering now the combination of control set C, tracer K, current breaker G and the feed control sets D and E with their respective feed changing switches H and I, as wired together, and the current turned on by the switches 425 and 426, the motors 246 of all three control sets being switched on and running, said current will actuate all three sets of magnets, and when the circuit to tracer wire 229 is switched on by one of the button switches carried on the tool carriage A on switch box 77, the circuit 229 and 331 will be turned on, and the left magnet 266 will feed the tracer and tool to pattern and stock, then while feed changing switch I being set for continuous feed motion, the control set E feeds the tracer downward on the slides of the pedestal, and as the tracer has to climb a high edge, the contact lever forces contact 220 against contact 222, thus closing the circuit 331 and 331′. When the right magnet 265 pulls the tracer from the pattern, but not being able to climb quick enough, a further pressure against the tracer pushes the sliding contact 222 further rearwards and opens the contacts 231 and 232, thus opening the battery circuit 235 and 245. Thereupon the relay magnet 429 lets go, opening the circuit 421 and 359 and thereby stops both feed motions until the tracer has climbed the high edge, then the pressure against the tracer being released, the contact 222 returns under spring pressure and the contacts 231 and 232 resume their normally closed position, closing the battery circuit 235 and 245, thus closing the power circuit 421 and 359. The feed motion of tools and tracer is continued until the K tracer strikes the bottom of pattern 462, when the shifting rods 354 and 354′ push the feed changing switches over to the opposite position and close the circuit 360 and 424 operating the right hand magnet, and thereby reversing the feed motion of the tracer and tool. At the same time, the feed changing switch H passes with its contact 31 over the timing plate contact 30 and the switch 374 being set for the circuit 361 and 424, the left hand magnet of control set D gives the feed screw 113 a fractional turn, feeding pattern and stock say 1/64 of an inch, which is the amount of material to be cut on the next stroke of the cutting tool. This in short explains the joint action of the connected parts.

The action of the current breaker will now be explained in connection with the wiring diagram, the wire 330 connected to brush 327 feeds the current to the supply ring 342 which is then broken and taken off the surface 343 of the running breaker disk, by brush 328 and conducted by wire 331 to the magnets of control set C and the solenoid 207 operating one of my wire cores, and attracting the small armature 208 and the contact lever 27 to which it is mounted, in short magnetic periods which coincide with the short periods of the interrupted current as it flows through the tracer contacts to the magnets. This action of the solenoid 207 in attracting the contact lever 27 adds greatly to the speed and fine tracing motion of the tracer point in contact with the pattern of which the current breaker is of prime importance, in interrupting the current for exceedingly short periods of from 45 to 60 per second, which in turn are able to operate my high speed magnets by means of the wire core which really consists of about 1200 thin magnets, each wire forming a complete magnet in itself, which these short current periods are able to energize. The interruption of the spark by means of the air channel and strong air current over the current breaker surface is of great importance in connection therewith, as the contacts can be set very close together, there being no arcing between the tracer contacts, and the break being complete and exceedingly quick, and not depending on the action of the tracer point itself in contact with the pattern, brings out the result of fine, smooth and quick action of the tracer and consequently of the whole machine. The relays M, N and O are all furnished with my wire cores and operate quickly, and I will now explain the action of the L tracer, which in all its actions does not handle the current from the power line direct, but through means of the interposed relays N and O, which in turn are operated by batteries 416 and 420. For certain kinds of work where slow action is desired, I use the relay control; then the switches 425 and 426 are opened and the switches 427 and 428 are closed. This is all that is required to switch the feed control sets D and E over the L tracer which now controls the actions of the machine. The axial feed motion "to" and "from" the pattern and stock of the L tracer and the tool connected with it in the same tool carriage, is done by the magnets of the control set F operating the feed screw 81 and the general action of the L tracer is like the K tracer, and the contact 220 of the contact lever 27 operates in the same manner between the contacts 223 and 224 and operates the relay circuit 406 and 407 which is normally open. When the contacts 220 and 223 touch each other, which is the "to feed" position and which engagement is caused by the tracer touching the pattern and causing the contact 220 to touch the contact 224. This movement closes the relay O and it changes the circuit 412 and 465 to the circuit 413 and 465, which is the "from feed" position. However, if the L tracer meets a too high section of the pattern, then the extra pressure against the tracer point from said high section pushes the endwise moving sleeve 222 rearward and moves the contact washer 401 against the contact 232 and thereby closes the normally open battery circuit 403 and 404, thus closing the relay and thereby opening the feed circuit 423 and 359. This movement will stop both feed motions until the L tracer has climbed said high section, when the tracer releases the pressure against the sleeve 222 and the contacts 401 and 232 are brought back to their normal open position by spring 223, as shown in Fig. 23, which illustrates said detail of construction of the L tracer. The above description explains the wiring diagram and the actions of the machine in connection therewith.

The control cabinet 454 is preferably located some distance in rear of the pedestal 34, which gives the operator sufficient space to pass from one side of the machine to the other, and at the same time gives him ready access to the control cabinet in which are located all of the relays, switches current breaker batteries and the like, and also from which all the wire connections are made and extend in the form of two combination cables 457 to two switch boxes 77 located one on each side of the machine and connected to and moving with the respective tool carriages A and B. The control cabinet is provided on its top near its sides with pipe flanges 455, and the bent pipe sections 456 are screwed into said flanges, while the cables 457 are passed through it, and have sufficient slack to allow for the movement of the tool carriages A and B up and down the sides of the pedestal. The ends of the wires are passed through the nipples 458 giving access to the wires and permitting connections with the various button switches located in said switch boxes.

An air cooling system is provided for in case a high voltage power current is used with my control apparatus, and while for ordinary uses in die cutting 110 volt direct current is sufficient, I have used 220 volt direct current very successfully for wood carving with my control apparatus, and have gained much better results and considerable faster cutting speed of the machine. In this case, air cooling of the magnets and the tracer contacts is of great advantage, and an ordinary small blower (not shown) may be used for an air supply which is piped to the various control sets and connected to the screw threaded opening 459 in the front part of the casing of each control set, and a flexible hose 244 is connected to the pipe connection 339 of the tracer casing (see Fig. 4) to lead the air into the pipe section 240 and then through the slots 241, 242 and 243 and to the respective tracer contacts in front of said slots.

What I claim as my invention is:

1. In a die sinking and carving machine or the like, comprising a tool, a circuit controlling tracer member including a tracer bar provided with an oscillatory bearing intermediate its ends, a tracer point carried at one end of said bar, a contact carrying and operating lever cooperating with the other end of said bar and adapted to be actuated thereby, two clutch magnets, two pairs of circuit controlling contacts, means providing two electric circuits including said contacts and leading directly from said contacts to said magnets, said contacts being operable by said lever under the influence of said tracer bar for energizing and deenergizing said magnets for the purpose of positioning said tool, and a suitable supply of rapidly interrupted direct electric current for said circuits.

2. In a machine for copying work from a pattern, a cutting tool, a work holder, a tracing device for controlling the operation of said tool, said tracing device including a tracer bar fulcrumed intermediate its ends, a tracer point arranged at one end thereof and adapted to engage with said pattern, a contact carrying lever cooperating with the other end of said bar, and three contacts for operating three electric circuits, two of said contacts positioned to be engaged by the contacts carried by said lever and adapted to energize and deenergize their circuits to actuate said tool, and the other contact operable under the influence of said lever to deenergize the circuit controlled thereby to arrest movement of said work holder.

3. In a copying machine having means for carrying a pattern and stock, a continuously operating current breaker, a circuit-controlling tracer member, a cutting tool, a tool control including two high speed clutch magnets rotated in opposite directions, and controlling means including two pairs of contacts and suitable wiring directly connecting said clutch magnets and said tracer member, said current breaker supplying rapidly interrupted direct electric current for actuating said tool under the control of said tracer member.

4. In a copying machine having means for carrying a pattern and stock, a circuit-controlling tracer member, a plurality of tool carriages operating in spaced lateral relation and provided with cutting tools, means including shafts and gearing for operating said carriages, a tool control including two high speed clutch magnets revolving in opposite directions and arranged intermediate said shafts, controlling means for said tools including wiring for directly connecting said magnets and said tracer member, whereby cooperative control of said plurality of tool carriages and cutting tools may be obtained.

5. In a die sinking and carving machine, a tool carrying pedestal having a hollow chamber, a plurality of tools for said pedestal disposed on opposite sides thereof, tool carriages for said tools, aprons supporting said carriages, said aprons being disposed on said opposite sides, a counterweight provided with a sheave arranged in said chamber, suitable sheaves mounted on said pedestal, and a flexible means connecting said tool carrying aprons and said counterweight and engaging said sheaves, said counterweight being adapted to counterbalance said aprons, and said aprons being adapted to counterbalance each other.

6. In a copying machine for die sinking and carving and the like, two movable tool supporting aprons, a cutting tool carried by each apron, a balancing device for both of said aprons including a counterweight provided with a sheave, two supporting sheaves, and a cable cooperating with said sheaves and connecting said counterweight with said aprons in balancing cooperation, said counterweight being adapted to counterbalance said aprons, and said aprons being adapted to counterbalance each other through the medium of said cable, sheaves and counterweight.

7. In an electrically operated automatic die sinking and carving machine adapted to cut stock from a pattern, the combination with a tracer and two cutting tools, said tracer and tools movable relatively to the pattern and stock in two directions at right angles to each other, of an electric control set for moving said tracer and the two cutting tools alike in one of said directions in line with their axes, another electric control set for moving the tracer and one cutting tool in the other of said directions and for moving the other cutting tool in a line parallel to the tracer and first mentioned cutting tool but in the opposite direction, and a stock frame for automatically moving said pattern and stock jointly in a third direction at right angles to both aforesaid directions, for the purpose of cutting one right and one left copy from one pattern simultaneously.

8. In die sinking, carving machines or the like, including a tracer and cutting tools, an electrically operated automatic control therefor, including means for carrying and operating the tracer and tools, means for supporting a pattern and stock, two electric control sets adapted to feed said tracer and cutting tools in two directions at right angles to each other, one of said control sets provided with suitable gearing whereby one of said tools may be operated in one or the other of two opposite directions, and a third electric control set for feeding the supporting means for the pattern and stock in a third direction at right angles to the first mentioned other two directions for the purpose of producing a plurality of copies in said stock from a given pattern.

9. In a die sinking, carving machine or the like, having a tracer and cutting tools, means for imparting to said cutting tools movement in response to movement of said tracer, including a control set comprising a motor, two high speed clutch magnets and means whereby said magnets are driven in opposite directions by said motor, a housing for said magnets, armatures and gearing adapted to be rotated by said magnets to actuate said motion imparting means, a combination brake and armature carrier rigidly connected with said gearing and revoluble with the armatures of the magnets, and means for keeping both armatures in evenly balanced sliding contact with said magnets.

10. In a machine for producing work from a pattern, the combination with a circuit controlling tracer member having a rapidly interrupted current passed thereto, an electromagnetic control set, and a tool the movements of which are controlled by said control set, said current being supplied by a rapidly rotating current breaker comprising a supply ring, a breaker disk, suitable brushes for said ring and disk, and suitable means including a member having an air channel provided with partitions dividing same into a plurality of passages to project a stream of pressure air divided into a plurality of jets across said breaker disk to interupt the arcing between the breaker disk and its brush, said partitions aiding in such interruption, whereby the flow of direct current may be positively interrupted for supplying rapidly interrupted direct electric current through said tracer member to said magnetic control set, said control set effecting the positioning of said tool to enhance the accuracy of the tracer and tool in producing work from a pattern.

11. In a die sinking, carving machine or the like, a tool control, comprising a circuit controlling tracer member and high speed clutch magnets adapted to operate with direct electric current, and a continuously operating current breaker interposed between the current supply and the tracer member for rapidly interrupting said current and causing said rapidly interrupted current to operate said high speed clutch magnets to position the tool in response to operation of the tracer member.

12. In a die sinking, carving machine or the like, a tool, a tool control, including a circuit controlling tracer member, magnets adapted to operate with direct electric current for positioning said tool, a continously operating current breaker interposed between the current supply and the tracer member and adapted to supply rapidly interrupted direct electric current to said magnets, and suitable means for changing the speed of said current breaker for varying the lengths of the periods of the interrupted current flowing to the magnets to thereby accommodate the speed of feed of the tool to the class of work done.

13. In combination with a die sinking machine, a tool, an electric tool control comprising a circuit controlling tracer member, a pair of high speed clutch magnets, each of said magnets having a shell-like body of soft iron provided with ring-like apertures, a composite wire core comprising a plurality of U-shaped wire sections for one of said apertures, suitable coils of wire arranged between the legs of the U-shaped sections of said composite core for magnetizing the same, an armature in rotative sliding contact with said magnet, and suitable means including motion imparting means arranged between said tracer member and cutting tool and including said magnet.

14. In combination with a die sinking and carving machine, an automatic electric tool control, tools and tool carrying means, feeding means for same, pattern and stock carrying and feeding means, electrical apparatus for feeding a pattern and stock in one direction and the tools in a direction at right angles thereto, and feed changing switches having means including an adjustable contact for supplying current, for controlling the feed of said parts either intermittently or continuously.

15. In combination with a machine for copying work from a pattern, a composite tool and stock feeding mechanism, two feed changing switches, each comprising two contacts for supplying current for continuously feeding one part of the mechanism its full length of travel in two directions, a timing plate for supplying current to feed the same part in the same direction but in short intermittent steps, and an adjustable contact adapted to be set to either connect said two contacts alternately or for intermittently passing said timing plate.

16. In combination with a machine for copying work from a pattern, a composite tool and stock feeding mechanism, a feed changing switch for the tool feeding mechanism, and a like feed changing switch for the stock feeding mechanism, both switches connected for cooperative action, and one switch supplying current for continuously feeding its part the full length of travel of said part, while the other switch supplies current to feed its part in a transverse direction and in short intermittent steps, each switch comprising suitable means including an adjustable contact for reversing the action of said switches.

17. In combination with a machine for copying work from a pattern, a composite tool and stock feeding mechanism, feeding means for the tools and feeding means for the stock, a shifting rod disposed in line of the tool feed and another shifting rod disposed in line of the stock feed, said rods arranged at right angles to each other and suitably coupled for joint action, and feed shifting devices coupled to said shifting rods for operating said feeding means for feeding the tools the full width of the stock, and for feeding the stock in intermittent short spaces, said shifting devices arranged to change the full width stroke to the full length stroke of the stock, and the intermittent feed to the tools.

18. A die sinking and carving machine, comprising a tracer and cutting tools, means for holding a pattern and stock including a bed, a movable bed plate, a series of stock posts adapted to be suitably spaced and mounted on the bed plate, according to the size of pattern and stock to be held, pattern and stock holding means for each stock post, means for holding said holding means in predetermined positions on said stock posts, and means for adjusting said holding means and tracer and cutting tools in spaced relation to each other according to the size of said pattern and stock.

19. A die sinking and carving machine, provided with a tracer and cutting tools, and means for holding a pattern and stock, including a series of stock posts, a plurality of angle brackets carried by said posts and adapted to be disposed in predetermined positions thereon in cooperative relation to each other, said brackets adapted to hold round and irregular patterns and stock in proper working position for said tracer and cutting tools.

20. A die sinking and carving machine and the like, provided with a tracer and cutting tools, means for holding a pattern and stock, a bed, a bed plate, a series of stock posts suitably spaced and mounted on said bed plate to hold the sides and front edges of said pattern and blocks of stock, another series of said stock posts suitably spaced and mounted on said bed plate to support the rear end of said blocks of stock and said pattern, suitable angle brackets for both series of said stock posts, straight edges mounted to the front angle brackets, and set screws for the rear angle brackets for setting said pattern and blocks of stock tightly against said straight edges and in proper working position for said tracer and cutting tools.

21. In combination with die sinking, carving machines and the like, means for holding a pattern and stock, including a tool supporting pedestal, a bed, a movable bed plate, stock posts mounted on said bed plate and extending vertically therefrom, a guide rail mounted on said stock posts, an overhanging bridge mounted on said pedestal and cooperating with said guide rail, said bridge provided with slots for engagement with said guide rail, whereby said movable pattern and stock holding means are maintained in proper alignment with said pedestal.

22. In combination with die sinking, stone carving machines and the like, a bed provided with a bed plate, means for holding a pattern and stock including a plurality of stock posts mounted on said bed plate, a tool carrying pedestal, a loading device, means on said pedestal for mounting said loading device, said loading device including a loading beam having an expanded central portion, a mounting pivot for said base portion and on which said beam is revoluble, suitable guide pulleys mounted on said base portion and revoluble therewith, a suitable guide pulley on each end of said loading beam, and a cable for cooperation with said pulleys whereby loading and locating of said pattern and stock may be performed, the pivoted action of said beam facilitating positioning of the pattern and stock relatively to said posts and of said posts relatively to said bed plate.

23. In die sinking, carving machines and the like, a tool carrying pedestal, a pair of suitable tool supporting aprons arranged upon opposite sides of said pedestal and slidable thereon in either the same or opposite directions, said pedestal provided with a chamber housing a suitable counterweight, flexible means connecting said counterweight and said aprons, a motor, and connections between said motor and tools for driving said tools during their sliding movement relatively to said pedestal.

24. In die sinking, carving machines and the like, a tool carrying pedestal, a pair of suitable tool supporting aprons and tools therefor provided with tool driving pulleys, said aprons arranged to slide on the side portions of said pedestal in the same or opposite directions, and provided with guide pulleys, drive mechanism for said tools including a motor mounted on said pedestal, a step cone pulley driven by said motor, another step cone pulley and a driven pulley rotatably mounted on said pedestal and driven by a belt connecting said two step cone pulleys, an idler pulley mounted near the top of the pedestal in vertical alinement with said step cone pulleys.

25. In a die sinking, or carving machine for copying work from a pattern, a pedestal, a sliding tool carriage arranged at each side thereof, said pedestal provided with a chamber housing a counterweight, a supporting apron for each carriage and a flexible connection between said aprons and counterweight, a tracer member and a cutting tool for each carriage, two feed screws and a control set adapted to feed said aprons in like or opposite directions, a single stock frame for carrying the pattern and stock for each tracer member and cutting tool and moving at right angles to said aprons, and two control sets and suitable gear connections for moving the tracers and cutting tools in line with their axes, whereby two pieces of work may be produced at the same time, themselves unlike but like the patterns.

26. In an electrically operated automatic die sinking, or carving machine, a pedestal, sliding means including a tool carriage arranged upon each side thereof, a cutting tool for one carriage, a circuit controlling tracer member and a cutting tool for the other carriage, two feed screws with which said sliding means cooperate respectively and an electric control set for operating said screws, whereby one tool carriage is fed in one direction and the other tool carriage is fed in the opposite direction, for the purpose of producing a right hand and a left hand copy from the same pattern at the same time.

27. In a machine for duplicating work from a pattern, having a circuit controlling tracer member and a cutting tool, means for controlling said tool in response to movement of said tracer member, including a control set comprising two clutch magnets, a shaft on which said magnets are driven in opposite directions, means for supplying a rapidly interrupted direct electric current to the clutch magnets under the control of said tracer member, an armature carrier rigidly mounted on said shaft between said magnets, pins carried by said armature carrier, armatures loosely mounted on said pins, said carrier provided with resilient members bearing against said armatures and exerting a slight pressure there-against to hold said armatures in constant contact with said magnets, whereby when said magnets are energized the armatures will immediately adhere thereto and the operating speed of said control set in controlling said tools be increased.

28. In a machine for duplicating work from a pattern, having a circuit controlling tracer member and a cutting tool, means for controlling said tool in response to movement of said tracer member including a control set comprising two clutch magnets, a shaft on which said magnets are loosely driven in opposite directions, a combination armature carrier and brake comprising a disk carrying pins and provided with holes and a peripheral V-shaped edge, two armatures arranged at opposite sides of said disk and between said magnets and slidable on said pins, coil springs loosely arranged in said holes and bearing slightly and evenly against said armatures, and a brake member in adjustable contact with said V groove for arresting momentum of said disk upon deenergizing of said magnets whereby the accuracy of said set in controlling said tools under the influence of said tracer member is increased.

29. In a machine for duplicating work from a pattern, the combination with a tool, of an electric controlling means for said tool including high speed clutch magnets, a constantly operating current breaker, a circuit controlling tracer member comprising in combination a tracer bar having a tracer point at one of its ends and fulcrumed between its ends for universal motion of its tracer point, contacts and contact carrying means, and a contact operating lever operatively associated with the other end of said bar, an armature for said lever, a solenoid magnet cooperating with said armature, and means for conducting rapidly interrupted direct electric current from said current breaker to the contacts of said tracer member and thence direct to said clutch magnets and said solenoid, whereby the operating speed of said tracer member and clutch magnets is increased.

30. In a die sinking and carving machine, the combination of a tracer and cutter, the tracer being provided with a universally movable point, means for feeding the tracer and cutter relatively to a pattern and work, high speed electric clutches for controlling said feed, means for operating one of said clutches when said tracer point is out of contact with the pattern and the other when the point is moved by contact with the pattern, means providing a rapidly interrupted direct electric current, and suitable means for operatively applying said current to said tracer and said electric clutches whereby the cutting of the work is automatically controlled by said tracer point.

31. A die sinking and carving machine provided with a tracer and cutter, mounted for movement toward and from a pattern and work, respectively, means for mounting the tracer point for universal movement by contact with the pattern, means for simultaneously feeding the tracer and cutter toward and from the pattern and work, means including a rapidly interrupted direct electric current, and means for applying said current to said tracer when its point is out of contact with the pattern and when its point is moved by contact with the pattern, for controlling said feeding means in both directions.

32. In a die sinking and carving machine provided with a tracer and cutter mounted for movement toward and from a pattern and work, said tracer provided with a tracer point mounted for universal movement in response to contact with the pattern, of means for simultaneously feeding the tracer and cutter toward and from the pattern and work, means for feeding the pattern and work past the tracer and cutter respectively, high speed electric clutches for controlling said tracer and cutter feeding means, a second set of said clutches for controlling the second named feeding means, means for providing a rapidly interrupted direct electric current, and means for operatively applying said current to said tracer and therefrom direct to said electric clutches whereby said clutches are controlled by said universally movable tracer to thereby rapidly feed the tracer and tool relatively to the pattern and work.

33. In a die sinking and carving machine provided with a tracer having a tracer point, and a cutter, said tracer and cutter mounted for movement toward and from a pattern and work, respectively, a pair of high speed clutches, means for mounting the tracer point for universal movement by contact with the pattern, means providing rapidly interrupted direct electric current, suitable means for operatively applying said current to said tracer and therethrough directly to said high speed clutches for positively feeding the tracer and cutter in an axial direction toward and from said pattern and work, feeding means for causing relative movement between the tracer and cutter and the pattern and work transversely of said axial movement, said pair of high speed clutches operatively controlled by said tracer point for controlling the axial feed of said tracer and cutter, and a second pair of high speed clutches operatively controlled by said tracer point for controlling said transverse feed.

34. In a die sinking and carving machine, the combination with a tracer having a tracer point, and a cutter, said tracer and cutter mounted for axial movement toward and from a pattern and work, of means for positively moving the tracer and cutter toward and from the pattern and work, means for causing relative movement between the tracer and cutter and pattern and work transversely of said axial movement, means for mounting the tracer point for universal movement by contact with the pattern, a pair of magnetic clutches adapted to be energized one at a time to control the axial movement of said tracer and cutter toward and from the pattern and work, means providing a rapidly interrupted direct electric current, suitable means for operatively applying said current to said tracer and therethrough directly to said electric clutches, said clutches being thus directly controlled by said tracer point for controlling the movement of said tracer and tool relatively to said pattern and work, a magnetic control set providing a feeding means for said transverse movement, and electrical contact members controlled by said tracer point for operating said last named control set, whereby the transverse feed may be arrested when said tracer point is moved in excess of a predetermined amount.

35. In a die sinking and carving machine, the combination with a tracer having a tracer point, and a cutter, said tracer and cutter mounted for movement axially toward and from a pattern and work respectively, of means, including a screw for positively moving said tracer and cutter, gear mechanism for turning said screw, a pair of high speed magnetic clutches cooperating with said gear mechanism for turning said screw in one direction or the other according to which clutch is energized, means for mounting the tracer point for universal movement by contact with the pattern, means providing a rapidly interrupted direct electric current, and suitable means for operatively applying said current to said tracer and therethrough directly to said electric clutches, said means adapted to be controlled by the movement of said tracer point for energizing and deenergizing said clutches, whereby said screw is adapted to move the tracer and cutter toward and from the pattern and work.

36. In a die sinking and carving machine, the combination with a tracer and cutter mounted for axial movement toward and from the pattern and work, of a screw for positively feeding said tracer and cutter toward and from the work in the direction of their axes, gear mechanism for operating said screw in both directions, a pair of high speed clutch magnets, an armature for each of said magnets providing a pair of clutches, a combined armature carrier and brake member revoluble with said gear mechanism, means providing rapidly interrupted direct electric current for operating said clutches through the medium of said tracer, said tracer being in direct electric connection with said magnets, one clutch being operative to rotate said gear mechanism in each direction of feed, and means cooperating with said brake member for preventing excess motion of said feed screw and gear mechanism when the feed is reversed by said clutches.

37. In a machine for duplicating work from a pattern, the combination of a tracer and cutter cooperating respectively with the pattern and work, said tracer being provided with a body portion, a universally movable tracer point carrying member mounted in said body portion and movable relatively thereto, electrical contacts adapted to be controlled by the position of said tracer point member with respect to the body portion, certain of said contacts being closed when said tracer point is in normal position and out of contact with the pattern and others of said contacts being closed by movement of the tracer point relative to said body portion by contact with the pattern, means for effecting feed of the tracer and cutter relatively to the pattern and work, high speed electro-magnetic clutches operated by the closing of said contacts under the influence of said tracer point for controlling said feed, means providing a rapidly interrupted direct electric current, and suitable means for operatively applying said current to said tracer and from the contacts controlled thereby directly to said clutches for increasing the operating speed of said tracer and magnets.

38. In a machine for duplicating work from a pattern, the combination with a tracer and cutter, of means for positively feeding the tracer and cutter toward and from the pattern and work respectively, said tracer having a tracer point mounted for universal movement, a plurality of electric circuits provided with circuit closing contacts, a contact lever actuated by said tracer point, a solenoid magnet adapted to move said lever in one direction for holding certain of said contacts in closed relation when said tracer point is in normal position, others of said contacts adapted to be closed by movement of said lever in response to movement of said tracer point out of normal position when the tracer point engages the pattern, electro-magnetic clutches in the circuits controlled by said contacts, said clutches arranged for operating said feeding means, means providing a rapidly interrupted direct electric current, and suitable means for operatively applying said current to the contacts controlled by said tracer point and therefrom directly to said clutches, for increasing the operating speed of said tracer and magnets.

39. In a machine of the character described, the combination with a carriage having a circuit controlling tracer and a cutter movable therewith, of means for positively feeding the tracer and cutter axially toward and away from a pattern and work respectively, a pair of high speed wire cored electromagnetic clutches, means interposed between said clutches and carriage for controlling the feed of said tracer and tool, a tracer point member adapted when in normal position and out of contact with the pattern to render one of said clutches active to effect feed by said means of the tracer and cutter toward the pattern and die, means providing a rapidly interrupted direct electric current for rapidly energizing and deenergizing the clutch magnets when active, and suitable means for controlling activation of said magnets by said current under the control of said tracer as determined by movement of its point relatively to the pattern, whereby when one clutch magnet is deactivated and the other magnet is activated operation of said feeding means will be instantly reversed due to absence of sustained magnetization of said clutches by said interrupted current.

40. In combination with a machine for duplicating work from a pattern, a cutting tool, electric controlling means for said tool including high speed clutch magnets and a circuit controlling tracer, said tracer comprising a tracer bar, a tracer point secured to one end of said bar, means for pivotally supporting said bar intermediate its ends for lateral and longitudinal movement, a contact holder carrying circuit closing contacts, means adapted to be operated by said bar whereby electric circuits including said clutch magnets may be opened and closed by lateral and longitudinal movements of said bar by contact of the tracer point with the pattern, means for supplying rapidly interrupted direct electric current to said contacts, and wiring direct from said contacts to said magnets for accelerating action of said magnets and hence accelerating said feeding movement.

41. In combination with a machine for duplicating work from a pattern, a cutting tool, electric controlling means for said tool including high speed clutch magnets, a circuit controlling tracer, said tracer comprising a tracer bar provided with a tracer point at one of its ends and an operating member at its other end, a ball and socket bearing for said tracer bar arranged intermediate its ends to permit universal lateral movement of the tracer point, said bearing being arranged to also permit longitudinal movement of the tracer bar, a lever actuated by said operating member, a plurality of circuit controlling contacts arranged for actuation by said lever in response to lateral and longitudinal movement of said bar, a solenoid magnet and resilient means for normally holding said lever and tracer bar in normal position and for restoring them to such position after movement, means providing a rapidly interrupted direct electric current, and suitable means for supplying said current to said contacts and therethrough under the control of said tracer to said electric clutches.

42. In combination with a machine for duplicating work from a pattern, a cutting tool, electric controlling means for said tool including high speed clutch magnets, a circuit controlling tracer, said tracer having a tracer bar provided at one end with a tracer point and an operating member at its other end, a bearing support for said bar intermediate its ends and so arranged as to permit lateral and longitudinal movement of said bar, a plurality of contacts for electric circuits, a lever for opening and closing said circuits through said contacts, said lever operative by said member, a solenoid magnet normally energized to attract said lever for closing one pair of contacts and the circuit thereof, and means providing rapidly interrupted direct electric current to said solenoid magnet and through said contacts to said clutch magnets for enhancing the operating speed of the movable parts of said tracer and clutch magnets.

43. In combination with a machine for duplicating work from a pattern, a circuit controlling tracer member, a cutting tool, electric controlling means for said tool including high speed clutch magnets, a circuit controlling tracer, a tracer bar for said tracer, said bar fulcrumed intermediate its ends, a tracer point at one end of said bar, an operating member at the other end of said bar, a contact carrying member, means operated by said bar for opening and closing electric circuits through said contacts, adjustable means cooperating with said bar for counterbalancing the weight of the tracer point and thereby equalizing the bar at each side of its fulcrum, and means for supplying rapidly interrupted direct electric current to said contacts and therefrom to said magnets for operating said magnets in direct connection with said tracer, whereby the operating speed and accuracy of the movable parts of said tracer and of the circuit controlling mechanism is assured.

44. In a machine for die sinking, carving and the like from a pattern, a movable stock frame including adjustable posts, pattern and stock holding members mounted on the posts, a pedestal, a carriage movable relatively to said pedestal, a tracer and a cutter carried by the carriage and having axial movement therewith to and from the pattern and stock holding means, said tracer also having lateral movement independent of the movement of the carriage, means for reciprocating the carriage predetermined distances vertically of the pedestal, means for moving the pattern and stock holding means horizontally relatively to the pedestal for predetermined distances, means for moving the tracer and cutter axially to and from the pattern and stock, power means for imparting power to said movement imparting means, means for providing a rapidly interrupted direct electric current, and suitable means for operatively applying said current to the power means for moving said carriage under control of said tracer for controlling the movement of the said tracer and tool in accordance with movement of said tracer.

45. A machine for copying work from a pattern, including a pedestal, a movable stock frame for carrying the pattern and stock, an apron slidably mounted relatively to said pedestal, a tracer and a cutter carried by the apron and capable of movement relatively thereto in the direction of their axes toward and away from the pattern and stock, means for reciprocating the apron vertically of the pedestal, means for moving the tracer and cutter carried thereby relatively thereto, means for reciprocating the stock frame horizontally tranversely of said axial movement, a source of rapidly interrupted direct electric current, means including electromagnetic clutches operable by said current and energized in response to movement of the tracer for producing said axial movement, means including electromagnetic clutches and a supply of current therefor and two interdependent switches controlled by movement of said apron and said frame, for controlling the reciprocating movement of said apron and of said frame, respectively.

46. In a machine for copying work from a pattern, a pattern and stock holding frame, a pedestal, an apron carried by said pedestal and movable relatively thereto, a carriage mounted on the apron, a tracer and cutting tool carried by said carriage and axially movable therewith toward and away from the pattern and stock, means for imparting movement to said apron vertically of said pedestal, means for imparting movement to the frame transversely of said axial movement, means for imparting movement to said carriage, power mains for imparting movement to said movement imparting means, means for providing rapidly interrupted direct electric current, means for operatively applying said current to the power means for moving the carriage toward and away from the pattern and stock under the control of said tracer, and means including switches operated by either said apron or frame for applying electric current to the power means for moving both the apron and frame simultaneously, whereby the latter are moved relatively to the pedestal.

47. In a die sinking and carving machine operating in accordance with a pattern, a tool control including a circuit controlling tracer, a stippling tool, means for electrically controlling and operating said stippling tool relatively to a blank in response to movement of said tracer relatively to the pattern, and suitable control apparatus including a current breaker and means to vary its speed for producing interrupted electric current for causing predetermined stippling action of said tool upon the blank, the pattern lacking a stippled surface.

48. In combination with a machine for copying work from a pattern, comprising an electric tool control, a tracer and a cutting tool, a high speed solenoid magnet, a lever coacting with said tracer and influenced by said magnet, two high speed clutch magnets in circuit with said tracer for positioning said tool, means for supplying rapidly interrupted direct electric current to said clutch magnets and said solenoid magnet, and suitable wire cores for all of said magnets for enhancing the operating speed of said magnets.

49. In a die sinking and carving machine, a cutting tool, a suitable pressure air supply, electric controlling means for said tool including high speed clutch magnets, a circuit controlling tracer, electrical contacts, a tracer bar forming a part of said tracer, an oscillatory bearing for said bar intermediate the ends thereof, a tracer point forming one end of said bar, a lever operatively associated with the other end of said bar and actuated thereby for operating said contacts, and means connected with said air supply for applying a constant stream of air to each pair of said contacts for the purpose of insuring the exactness and efficiency of operation of said tracer.

50. In a die sinking and carving machine, a cutting tool, a suitable pressure air supply, electric controlling means for said tool including high speed clutch magnets, a suitable casing for said magnets, a circuit controlling tracer, a plurality of electrical contacts, a tracer bar forming a part of said tracer, a lever actuated by said bar for operating said contacts, and means connected with said air supply for applying a constant stream of air to each pair of said contacts and to said magnets for the purpose of increasing the exactness and efficiency of operation of said tracer and said magnets.

51. In a die sinking or carving machine, an upright member carrying pattern and stock in vertical alinement, a second upright member carrying tracer and cutting tool, and an overhead bridge, rigidly mounted to one member and having suitable sliding and supporting means engaging the other member, for suitable sliding support.

52. In a die sinking or carving machine, an upright member carrying pattern and stock in vertical alinement, a second upright member carrying tracer and cutting tool, and an overhead bridge, rigidly mounted to one member and having suitable sliding and supporting means engaging the other member, for suitable sliding support, and a loading device suitably mounted on said bridge.

In testimony whereof, I affix my signature.

EMIL R. LOCHMAN.